US012618802B2

(12) United States Patent
Timperman

(10) Patent No.: US 12,618,802 B2
(45) Date of Patent: May 5, 2026

(54) TRANSVERSE ALTERNATING CURRENT ELECTROPHORESIS SYSTEMS AND METHODS

(71) Applicant: The Trustees of the University of Pennsylvania, Philadelphia, PA (US)

(72) Inventor: Aaron Timperman, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 151 days.

(21) Appl. No.: 18/587,324

(22) Filed: Feb. 26, 2024

(65) Prior Publication Data

US 2024/0328997 A1 Oct. 3, 2024

Related U.S. Application Data

(60) Provisional application No. 63/486,738, filed on Feb. 24, 2023.

(51) Int. Cl.
*G01N 27/447* (2006.01)
*B01L 3/00* (2006.01)
*B03C 5/00* (2006.01)

(52) U.S. Cl.
CPC .. *G01N 27/44791* (2013.01); *B01L 3/502761* (2013.01); *B03C 5/005* (2013.01); *B01L 2300/0645* (2013.01)

(58) Field of Classification Search
CPC ........ G01N 27/44791; G01N 27/44721; B01L 3/502761; B01L 2300/0645; B03C 5/005; B03C 5/028
See application file for complete search history.

(56) References Cited

U.S. PATENT DOCUMENTS

2004/0256230 A1* 12/2004 Yager ............... G01N 27/44795
204/600
2020/0188911 A1* 6/2020 Gagnon ............... G01N 27/026

OTHER PUBLICATIONS

Kostal et al., "Fast Determination of Mitochondria Electrophoretic Mobility Using Micro Free-Flow Electrophoresis," Anal. Chem. 2009, 81, 9267-9273 (Year: 2009).*

(Continued)

*Primary Examiner* — Alexander S Noguerola
(74) *Attorney, Agent, or Firm* — BakerHostetler

(57) ABSTRACT

A method, comprising: determining electrophoretic mobility associated with a particle in a transverse alternating force microfluidic channel; determining a size of the particle based at least in part on one of Brownian motion of a particle or one or more images of the particle. A system comprising: a microfluidic channel; a plurality of electrodes oriented transverse to the microfluidic channel, the plurality of electrodes comprising an alternating electric field; and a classification system configured to: determine one or more of the following: an electrophoretic mobility associated with a particle in the transverse AC microfluidic channel and/or determine, based at least in part on the electrophoretic motion, and size from image analysis or Brownian motion of a particle or one or more images of the particle, particle shape, particle deformability, for recognition of surface characteristics, such as assaying for receptors and ligands, and to perform electroporation.

20 Claims, 23 Drawing Sheets

(56) References Cited

OTHER PUBLICATIONS

Cid et al., "Measurement of the amplitude and phase of the electrophoretic and electroosmotic mobility based on fast single-particle tracking," Electrophoresis 2021, 42, 1623-1635 (Year: 2021).*

Ikeda et al., "AC electrophoretic mobility of individual microscale colloidal particles measured using holographic video microscopy," Appl. Phys. Lett. 114, 153703 (2019) (Year: 2019).*

Afshar et al., "Magnetic Particle dosing and size separation in a microfluidic channel", Sensors and Actuators B: Chemical, 2011, pp. 73-80.

Choi et al., "Measuring the electrophoretic mobility and size of single particles using microfluidic transverse AC electrophoresis (TrACE)†", LabChip, 2024, vol. 24, pp. 20-33.

* cited by examiner

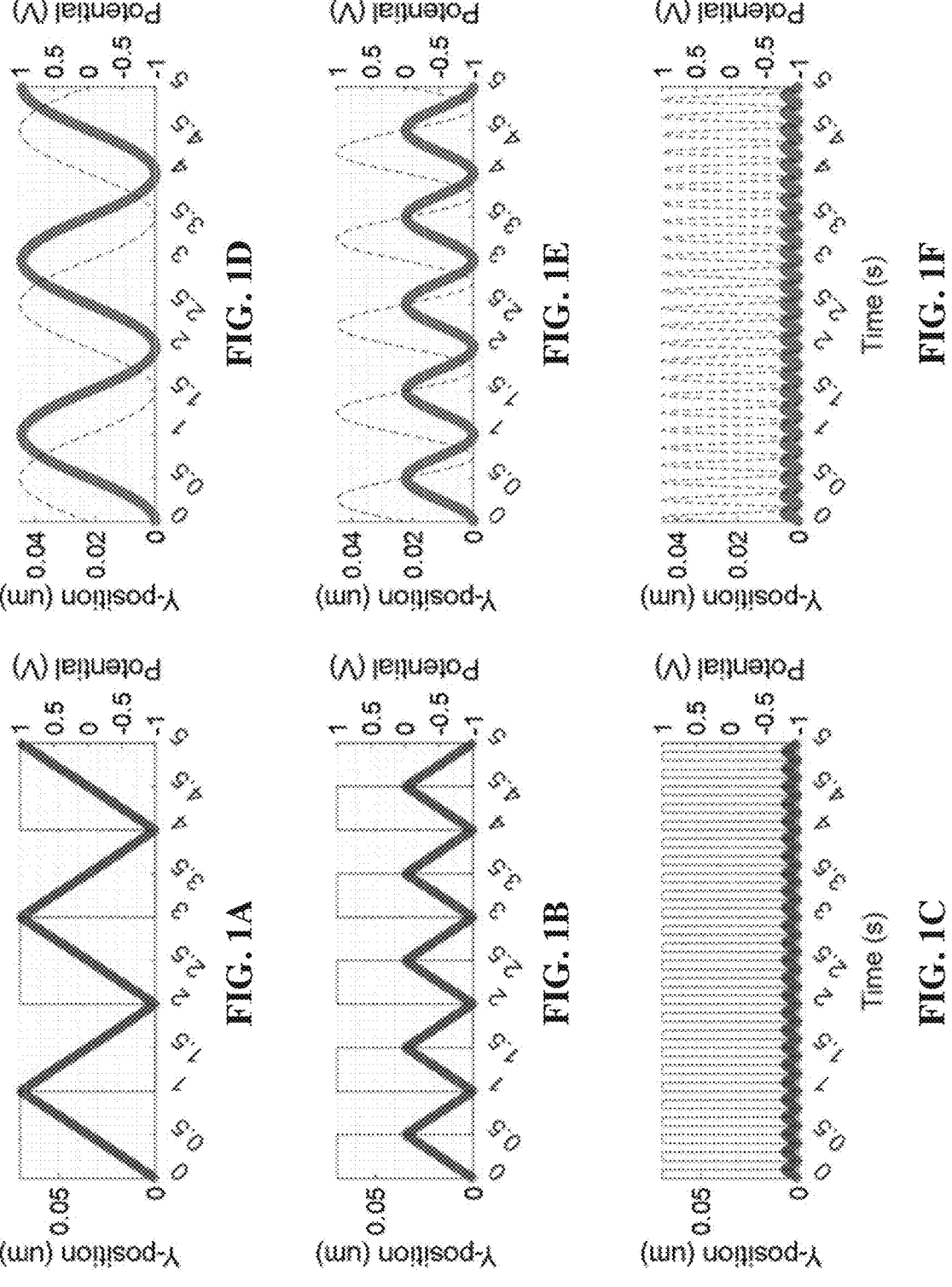

SEE FIG. 5D

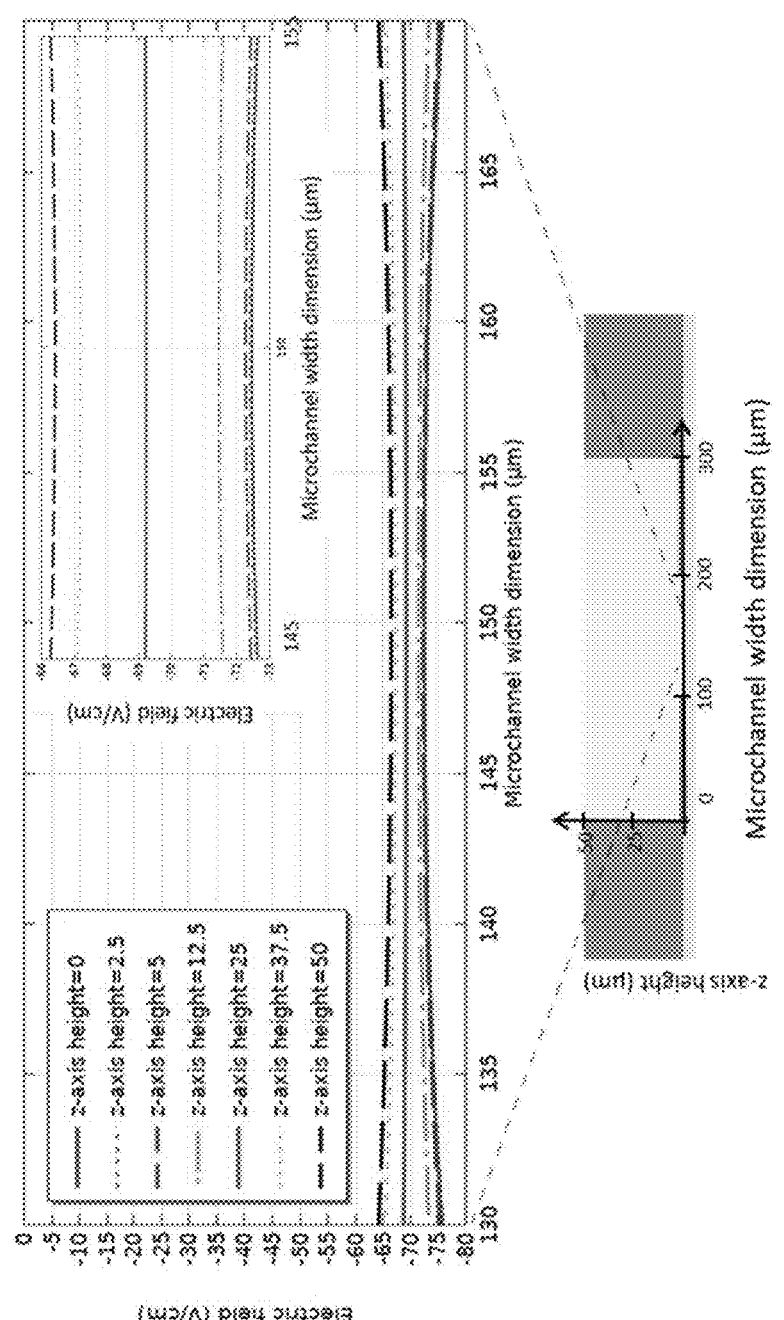
FIG. 8

Vertical electrodes on the microchannel walls, as shown in the cross below, provide  improved performance

TRANSVERSE ALTERNATING CURRENT ELECTROPHORESIS SYSTEMS AND METHODS

CROSS-REFERENCE TO RELATED APPLICATIONS

This application claims the benefit of U.S. Patent Application No. 63/486,738, filed Feb. 24, 2023, which application is incorporated herein by reference in its entirety for any and all purposes.

GOVERNMENT RIGHTS

This invention was made with government support under 1808225 awarded by the National Science Foundation. The government has certain rights in the invention.

TECHNICAL FIELD

The present disclosure relates to the field of microfluidic electrophoresis.

BACKGROUND

Detection and characterization of particles, whether biological, organic, or inorganic, has become essential in many fields ranging from clinical to environmental analyses. For example, physical properties such as the size and charge of the living particles play an important role in regulating essential biological activities and further serve as a marker for cells' physiological states. Also, an interest in physical characterizations of contaminants such as microplastics in water has grown rapidly as water purification becomes a pressing and important issue.

Existing methods of characterization, however, have certain deficiencies. Accordingly, there is a long-felt need in the field for improved methods of particle characterization and for related systems.

SUMMARY

Detection and characterization of particles, whether biological, organic, or inorganic, has become essential in many fields ranging from clinical to environmental analyses. For example, physical properties such as the size and charge of the living particles play an important role in regulating essential biological activities and further serve as a marker for cells' physiological states. Also, an interest in physical characterizations of contaminants such as microplastics in water has grown rapidly as water purification becomes a pressing and important issue. Aeolian dust from the desert carries a wide range of inorganic particles and micronutrients to the oceans. Regardless of their type, nearly all of these particles have some surface charge. The surface charge of particles is most frequently characterized by measuring the electrophoretic mobility ($\mu_{ep}$). The electrophoretic mobility is equal to the electrophoretic velocity, which is dependent on particle's size and shape, divided by the electric field (E), i.e. $\mu_{ep}=v/E$.

Particle characterization techniques can be classified as an ensemble or single particle methods, while the most appropriate method for a particular application depends on the analytical needs. For example, ensemble measurement techniques such as laser diffraction and dynamic light scattering (DLS) measure and determine an average or a distribution of the members of the sample population. Ensemble methods can sample much greater numbers of particles than single-particle measurement techniques as they measure numerous particles in parallel. However, ensemble measurement methods cannot interrogate single particles, therefore, these techniques cannot provide the correlation during multi-parameter analyses and cannot be used as a particle sorting method. On the other hand, single particle measurement techniques, including various types of microscopy and Coulter counter, detect and measure individual particles. Although single-particle techniques usually analyze a reduced number of particles compared to ensemble techniques, they record specific characteristics of each particle. Thus, single-particle techniques provide significantly more information than ensemble measurement techniques. Nonetheless, direct characterization of individual particles remains challenging as these methods typically yield a low signal to noise (S/N) ratio, require longer processing time, and have lower sample throughput.

Characterization techniques can also be categorized by their measurable particle size range. Microscopy measures the size of single particles, but the measurements are dependent on wavelengths of the light source and sensitive to the optical properties of the particles, such as refractive index and the buffer medium. Another commonly used ensemble measurement method for particle sizing is dynamic light scattering (DLS). DLS uses light scattering to measure Brownian motion and determine particle size distribution. Although DLS is fast and non-invasive, the method is suitable only for spherical particles and struggles with polydisperse samples. A more recent technique called nanoparticle tracking analysis (NTA) couples light scattering and imaging to measure the size of single particles in suspension. However, NTA is appropriate only for nanometer-sized particles with a low seeding density, and high user variability has been reported.

Electrophoretic techniques enable measurement of the electrophoretic mobility, which is partially dependent on the particle's surface charge or zeta potential. Electrophoretic light scattering (ELS) is an ensemble measurement technique based on electrophoresis and DLS that measures the electrophoretic mobility and size distribution of a population. The main challenge with ELS is the bubble formation caused by high voltages that distorts the field in the measurement zone, decreasing the reproducibility of the $\mu_{ep}$ values. Another commonly used method to measure electrophoretic mobility is capillary electrophoresis (CE). CE is a bulk separation method in which analyte elution order is dependent on their electrophoretic mobilities. CE is used for the separation and characterization of molecular species, although it can be used with particles including inorganic, cells, and microorganisms. While CE can provide unparalleled separation efficiencies, one critical challenge with CE is surface adsorption in the capillary that alters electroosmotic flow (EOF) and the variability in EOF contributes to highly varying $\mu_{ep}$ values. When CE is used for particle analysis, particle aggregation is often problematic and can preclude the observation of resolved peaks. Therefore, these challenges must be addressed to improve precision in electrophoretic mobility measurements.

Measurement of electrophoretic mobility of single particles remains a challenge, and improved measurement is expected to benefit a wide range of applications from wastewater treatment to cancer cell diagnostics. Here, we describe a novel technique, microfluidic transverse AC electrophoresis (TrACE), using particle tracking velocimetry, PTV, and low frequency (0.5, 1, and 5 Hz) AC electrophoresis. In TrACE, a single pair of electrodes creates an electric field of approximately 100 V/cm orthogonal to the flow direction in a microchannel. The oscillating particle trajectories are captured through the microchannel. TrACE provides multiplexed single-particle characterization with simultaneous tracking of multiple particles to increase throughput. We also explore the effect of Brownian motion, noise, and averaging on the precision of electrophoretic mobility measurements.

In one aspect, the present disclosure provides a method, comprising: determining an electrophoretic mobility associated with a particle in a transverse alternating force microfluidic channel; determining a size of the particle based at least in part on one of Brownian motion of a particle or one or more images of the particle.

In another aspect, the present disclosure provides a system comprising: a microfluidic channel; a plurality of electrodes oriented transverse to the microfluidic channel, the plurality of electrodes comprising an alternating current (AC) electric field; and a classification system configured to: determine an electrophoretic mobility associated with a particle in the transverse AC microfluidic channel and/or determine, based at least in part on one of Brownian motion of a particle or one or more images of the particle, a size of the particle.

In a further aspect, the present disclosure provides a method, comprising: comparing a behavior of a probe particle subjected to a transverse alternating force in a microfluid channel at a first point and a second point, the probe being contacted to a sample between the first point and the second point.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

FIGS. 1A-1F provide illustrative particle response to different electric waves and frequencies.

FIG. 8 provides an illustrative electric field inhomogeneity in the microchannel of the TrACE device.

DETAILED DESCRIPTION OF ILLUSTRATIVE EMBODIMENTS

Figure 2A:
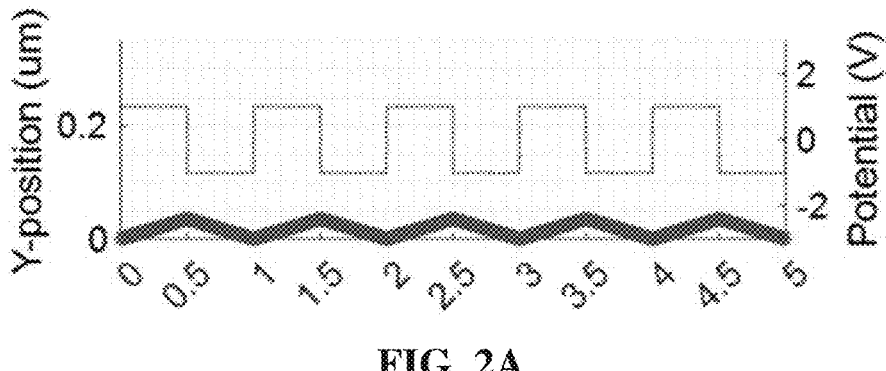
FIGS. 2A-2C provide illustrative particle response to different square wave amplitudes.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" can include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints. The endpoints of the ranges and any values disclosed herein are not limited to the precise range or value; they are sufficiently imprecise to include values approximating these ranges and/or values.

As used herein, approximating language can be applied to modify any quantitative representation that can vary without resulting in a change in the basic function to which it is related. Accordingly, a value modified by a term or terms, such as "about" and "substantially," may not be limited to the precise value specified, in some cases. In at least some instances, the approximating language can correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" can refer to plus or minus 10% of the indicated number. For example, "about 10%" can indicate a range of 9% to 11%, and "about 1" can mean from 0.9-1.1. Other meanings of "about" can be apparent from the context, such as rounding off, so, for example "about 1" can also mean from 0.5 to 1.4. Further, the term "comprising" should be understood as having its open-ended meaning of "including," but the term also includes the closed meaning of the term "consisting." For example, a composition that comprises components A and B can be a composition that includes A, B, and other components, but can also be a composition made of A and B only. Any documents cited herein are incorporated by reference in their entireties for any and all purposes.

Exemplary Disclosure

A few research groups have recently investigated a novel application for particle tracking velocimetry (PTV) for electrophoretic mobility measurements using a microfluidic device. In a traditional PTV, particle displacements are tracked in a moving or suspended fluid to calculate the particle velocity. Palanisami and Miller utilized PTV to simultaneously measure Brownian motion and electrophoretic mobility of the particles by recording the particle trajectories in DC electrophoresis. In this method, Brownian motion, measured by tracking random fluctuations in the particle trajectory, is used to determine the particle size-small particles move through the medium quickly, resulting in rapid fluctuations of motion compared to larger particles, which move through more slowly. Miller's group measured the bead diameter to ~12%, with the resolution improving with decreasing particle size. However, fluctuations beyond expected Brownian motion (excess noise) are observed and cause deviations in size measurements. Strubbe's group took a different approach and applied a high frequency AC electric potential in a microchannel to suppress EOF and measured the AC mobility of the particles by tracking particles' positions. While this method calculated the complex electrophoretic mobility of particles with different charges, the standard deviation varied from 4 to 22%, and a small number of particles (<12 particles) are tested. A strong electric field is also desirable when measuring a particle's electrophoretic mobility. Although both Miller and Strubbe's group applied high voltages to their systems (35 and 80 V), a long distance between electrodes limits the strength of the electric field within the microchannel (7 and 51 V/cm). Overall, both novel approaches demonstrate the challenges of measuring the precise electrophoretic mobility of an individual particle.

This disclosure provides microfluidic transverse AC electrophoresis (TrACE), a novel technique that measures electrophoretic mobility using low-frequency AC electrophoresis and PTV in a microfluidic channel. This simple TrACE device requires only a single microchannel, a pair of electrodes, and a low electric potential to create a high electric field. The low applied voltage falls below the electrolysis and bubble formation threshold, which can stop the analysis. The low potential and current in TrACE results in low power dissipation; therefore, Joule heating is expected to be negligible, which is beneficial for analyzing thermally sensitive biological particles, samples such as exosomes. In TrACE, particle characterization is achieved by recording the trajectories of individual particles and analyzing the response to the applied wave. A synchronizer is used for accurate temporal registration of the applied voltage and the image stack, making it possible to observe a phase shift if present. By controlling the bulk flow, the flow rate can be controlled independently from the electrophoretic motion of the particles. The residence time of the particle(s) in the detection window is extended by slowing the bulk flow while applying a low-frequency AC electric potential. Furthermore, multiplexing is possible in TrACE as several particles, controlled by the seeding density, can be simultaneously imaged in the detection window. The TrACE system can be used with any particle suspension that does not clog the microchannel and for which a trajectory can be recorded. Optical microscopy is not inherently required for imaging; although its benefits for recording precise trajectories are many as high spatial resolution is required. Here, we present a model of particle migration in TrACE, and experimentally measure the electrophoretic mobilities and sizes of polystyrene beads from the recorded particle trajectories while characterizing the system's operation.

All reagents are used without purification. Sodium phosphate dibasic anhydrous is obtained from VWR, whereas sodium phosphate monobasic and Tergitol (NP40S) are from Sigma Aldrich. FluoSpheres carboxylate-modified microspheres are from Thermo Fisher Scientific and Sphero carboxyl fluorescent microspheres are from Spherotech, Inc. SYLGARD 184 Silicone elastomer kit is purchased from Dow company, and the silicon wafers are from University Wafer, Inc. Cr/Au coated borate glass slide is from Telic company.

TrACE device was fabricated in two components: a polydimethylsiloxane (PDMS) channel and electrodes patterned glass slide. First, a silicon wafer mold was patterned using a commonly used soft photolithography method to include a single microchannel (300 μm (W)×11 mm (L)) and a reservoir (3 mm in diameter) at each end of the microchannel. A PDMS solution, prepared by mixing 10:1 ratio for PDMS to curing agent, was poured over the mold and cured overnight at 65° C. to make a PDMS microchannel. Next, electrodes patterned glass slide was fabricated via a standard wet etching process on a Cr/Au coated glass slide (Telic Company). A total of 9 devices were patterned onto each glass slide, and a glass cutter was used to cut out individual devices. Then, a PDMS microchannel and patterned electrodes slide were placed in a plasma cleaner (Harrick Plasma model PDC-32G) to clean the surfaces with atmospheric gas for one minute. Immediately after the plasma treatment, a PDMS microchannel was aligned to the patterned electrode slide using an in-house constructed x-y-z stage and pressed firmly for attachment. After the assembly, a weight was placed on top of the device and heated at 65° C. overnight to ensure complete attachment. Finally, an electrical wire was soldered onto an electrode to supply electric potential to the device. Additionally, the electrodes can be attached to the PDMS microchannel vertically up the walls of one or both sides of the microchannel.

First, the PDMS microchannel and reservoirs were cleaned by injecting isopropyl alcohol (IPA) solution and flushing the solution out with a vacuum. DI water was used immediately after to wash off any remaining IPA solution inside the channel. These cleaning steps were repeated three times to ensure no debris was found inside the microchannel. The sample solution was prepared by diluting the concentrated particles in a 0.1 mM phosphate buffer (PB) solution (pH 7.4) to the desired seeding density. Additionally, 1 μl of 0.1% NP40 was added to 1 mL of sample solution to prevent the particles from sticking to the microchannel. Three conditions were tested: 1) Bulk flow in the x-direction, 2) No flow or suspended particles in an aqueous solution, and 3) Stationary particles captured in a thin film of PDMS. The bulk flow was created via the height difference between the inlet and outlet reservoir solutions. Particles were suspended in an aqueous solution by ensuring no height difference between the solutions in inlet and outlet reservoirs. Lastly, beads were mixed with PDMS solution and cured into a thin film on a glass slide for stationary particles. Particles with varying diameters (0.53±0.013 μm, 1±0.016 μm, and 1.9±0.095 μm reported by the manufacturers) were used in this study. To record the particle trajectories, a TrACE device was placed on an inverted fluorescent microscope (Zeiss Axio Vert.A1), and the particles were imaged using a high-speed camera (Phantom VEO-E 340L) operating at 100 fps at 200 or 400-× magnification. For fluorescence imaging of the particles, a 532 nm laser (Opto Engine LLC) was used as a light source, and the microscope was adjusted to focus on the center of the microchannel to avoid edge effects. The electric field wave, either a square or sine wave, was applied between an electrode pair using a function generator (Keysight Technologies Model 33210A). The acquisition of the image stack of 500 frames was initiated by an external synchronizer (TSI Inc) for accurate synchronization of the applied electric field. The applied potentials are measured by the oscilloscope (Pico Technology), so the potential is known for calculations of $\mu_{ep}$.

The raw digital images were processed using the Crocker-Grier centroid-finding algorithm with five steps: preprocessing raw images, locating candidate particle position, refining the center of particles, detecting 'ghost' particles and linking time-resolved particle position. First, a median filter was applied to time stack the raw images to reduce the background noise level. The candidate centroids of particles were detected with the pixel-wise local maxima intensity method. Then, the centroids were refined based on intensity weight near the candidate centroids to provide subpixel accuracy. Since particles move with the flow or via Brownian motion, time-resolved centroids detection removes non-particle identification. Finally, the interframe linking algorithms selected the minimum overall linking distance among the subnetworks between two frames. A single frame gap closing method was utilized to construct long trajectories to tackle particle vanishing phenomena.

For the calculation of electrophoretic mobility, only y-positions were considered, as the electrophoresis happens in the y-direction. Y-positions of each particle were recorded using a PTV center detection algorithm in every frame, and the positions were characterized over time to get the particle trajectory. Then, the y-velocities of an individual particle were calculated over time by taking the derivative of the y-positions. The maximum velocity was found for every half of a wave cycle and was divided by the known electric field to calculate the electrophoretic mobility ($\mu_{ep}$=v/E). Since each particle was subjected to several cycles of an electric wave, multiple electrophoretic mobility values were calculated per particle, and an average was taken to describe the electrophoretic mobility of a single particle. Additionally, the ensemble average of electrophoretic mobility was calculated to describe the electrophoretic mobility for the particle population.

In TrACE, particle sizes were measured based on particle's velocity fluctuations due to Brownian motion in the x-dimension or via images. To measure particle size using Brownian motion analysis, particles in the center of the channel were considered. Also, a constant bulk flow rate was assumed and the particles traveled in the same xy-plane along the microchannel. Particle sizes were calculated based on one dimension Green-Kubo relation using the x-velocity variances of the particles. Pixel intensity from raw images of the particles were also used to determine the particle size in ImageJ. The intensity threshold, five times larger than the background, was used to measure particle diameters.

Quasi-Equilibrium Solution to a Theoretical Model

In a wide channel, we assume that the electric field is defined and uniform between the electrodes and takes the form $$E(t) = -\frac{2\Phi(t)}{a}\hat{y}, \tag{1}$$

where we consider both sinusoidal and square wave electric potentials. For example, in a sinusoidal, we use $$\Phi(t) = \Phi_0 \sin(\omega t), \tag{2}$$

where $\Phi_0$ is the amplitude of the applied voltage, $$\omega = 2\pi f \tag{3}$$

is its angular frequency, and f is its frequency.

Newton's second law, $$m\ddot{r} = qE + mg - m'g - 3\pi D\eta(\dot{r} - u), \tag{4}$$

describes the position r, velocity $\dot{r}=dy/dt$, and acceleration $\ddot{r}=d^2r/dt^2$ of a particle of mass (m) and charge (q) as it moves through the channel, where $g=-g\hat{z}$ is the gravitational acceleration vector and $$m' = \frac{\rho'\pi D^3}{6} \tag{5}$$

is the mass of buffer solution that is placed by a particle. The terms on the right side of Eq. (4) respectively describe the electric force, the gravitational force, the buoyant force, and the Stokes drag force on the particle.

When we substitute the Cartesian position $r=x\hat{x}+y\hat{y}+z\hat{z}$ into Eq. (4), we obtain three following component equations:

$$m\ddot{x} + 3\pi D\eta\dot{x} = 3\pi D\eta u(z) \tag{6}$$

$$m\ddot{y} + 3\pi D\eta\dot{y} = -\frac{2q}{a}\Phi(t) \tag{7}$$

$$m\ddot{z} + 3\pi D\eta\dot{z} = (m' - m)g \tag{8}$$

As described in equations (6)-(8), x(t) is driven by the Poiseuille flow, y(t) is driven by the electric potential, and the balance between buoyancy and gravity drives z(t). We can further simplify equations (6)-(8) in a quasi-equilibrium solution where the particle responds quickly to changes in the electric potential, and the net force on the particle and its acceleration are assumed at zero. Setting $\ddot{x}=\ddot{y}=\ddot{z}=0$ in equations (6)-(8), we can simplify the equations to give $$\dot{x} = \frac{6\bar{u}z}{c}\left(1 - \frac{z}{c}\right) \tag{9}$$

$$\dot{y} = \widetilde{v_y}\sin(\omega t) \tag{10}$$

$$\dot{z} = v_z \tag{11}$$

From equations (9)-(11), we focus on Eq. (10), where the particle response is driven mainly by the electric potential. Eq. (10) describes that the transverse component of the quasi-equilibrium velocity is determined by the electrophoretic response to the applied potential, with a velocity amplitude given by $\widetilde{v_y}$, $$\widetilde{v_y} = \frac{2\mu\Phi_0}{a} \tag{12}$$

and electrophoretic mobility is defined as $$\mu = \frac{q}{3\pi D\eta}. \tag{13}$$

Figure 2B:
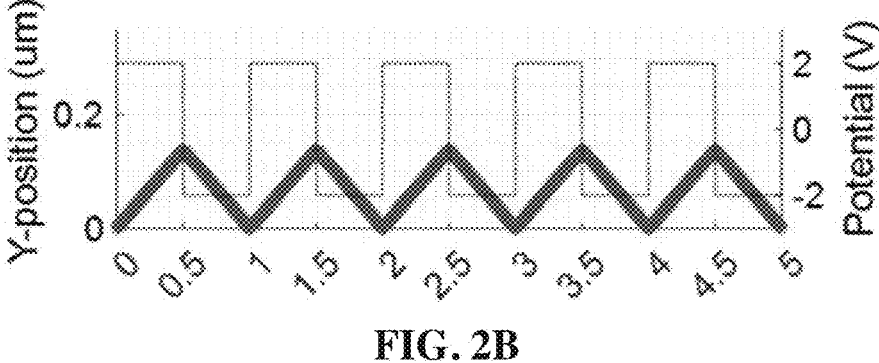
Figure 2C:
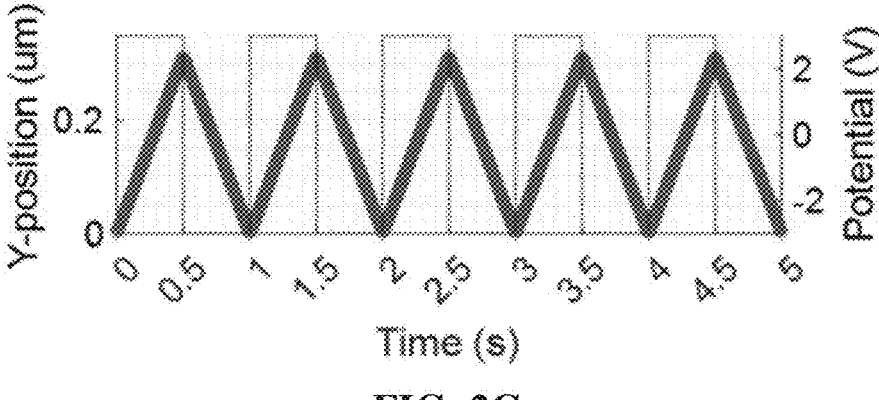

A particle's transverse position is solved by integrating the velocity equation, such as Eq. (10) for the sine and square wave over time. Since the amplitude of the velocity ($\widetilde{v_y}$) described here can be considered as a constant, integration of a sine wave yields a cosine particle trajectory (FIGS. 1D-1F). Likewise, the integration of the square wave produces a saw-tooth particle trajectory (FIGS. 1A-1C). Similarly, a direct correlation is observed between the frequency of the applied electric wave and the particle trajectory. The particle oscillates at the same frequency as the electric field wave that drives its motion. As we increase the frequencies of both sine and square waves, the frequencies of the respective particle trajectories increase accordingly (FIGS. 1A-1F). Additionally, the amplitude of the particle trajectory is proportional to the frequency of the applied potential because the longer excursions at lower frequency increase the amplitude (FIGS. 1A-1F). Furthermore, changing the amplitude of the electric potential ($\Phi_0$) affects the velocity amplitude as described in Eq. (10). As the amplitude of the electric wave increases, the distance traveled during a half-wave cycle increases as well (FIGS. 2A-2C). Overall, these quasi-equilibrium solutions to a simple theoretical model sufficiently capture the particle response to the externally applied sine or square wave electric field.

FIGS. 1A-1F. Particle response to different electric waves and frequencies. The transverse positions are calculated under a square wave potential (1A-1C) and a sine wave potential (1D-1F) at 0.5, 1, and 5 Hz from top to bottom. The plots were plotted using the following equations:

$$\dot{y} = \widetilde{v_y} \times \text{applied electric wave and} \tag{1}$$

$$\widetilde{v_y} = \frac{2\mu\Phi_0}{a}, \text{where } a = \text{electrode spacing and } \mu = 3.48\frac{cm^2}{Vs}. \tag{2}$$

Transverse positions of the particle in red and blue lines are described on the left y-axis, and the applied electric waves, graphed with dotted black lines, are on the right y-axis.

FIGS. 2A-2C. Particle response to different square wave amplitudes. The transverse positions of a particle within the microchannel under a square wave potential with an amplitude of 0.5 V (2A), 1 V (2B), and 1.5 V (2C). They use the same equations as in FIGS. 1A-1F with the same value for the electrophoretic mobility. Transverse positions of the particle, graphed with blue lines, are plotted on the left y-axis and the applied wave electric potentials are given using a black dotted line on the right y-axis.

For a precise electrophoretic mobility measurement, electrophoresis must be a primary force driving a particle motion in the y-dimension. The ratio of particle displacements from electrophoresis and Brownian motion is critical in the evaluation of the potential precision of the electrophoretic mobility measurement. Thus, we define the ratio by using the following equations.

Given that electrophoretic mobility is defined as $$v_e = \mu E, \tag{14}$$

distance traveled by a particle can be defined as $$l_E = v_e t, \tag{15}$$

and path length traveled due to Brownian motion can be defined as $$l_B = \sqrt{2Dt}.$$ (16)

Thus, the ratio between these two distances can be defined as $$\frac{l_E}{l_B} = \frac{\mu E t}{\sqrt{2Dt}}$$ (17)

based on Eq. (15) and (16). Rearranging Eq. (17), a final equation can be further simplified to $$\frac{l_E}{l_B} = \frac{\mu E}{\sqrt{2D}} \sqrt{t}.$$ (18)

As a large $$\frac{l_E}{l_B}$$

improves the precision at which the electrophoretic mobility can be measured, measurement precision increases as u and E increase and as the square root of the diffusion coefficient decreases. Overall, to achieve a precision within 1%, the ratio of particle displacements from electrophoresis and Brownian motion must be greater than 100.

Figures 3A, 3B, 3C, 3D:
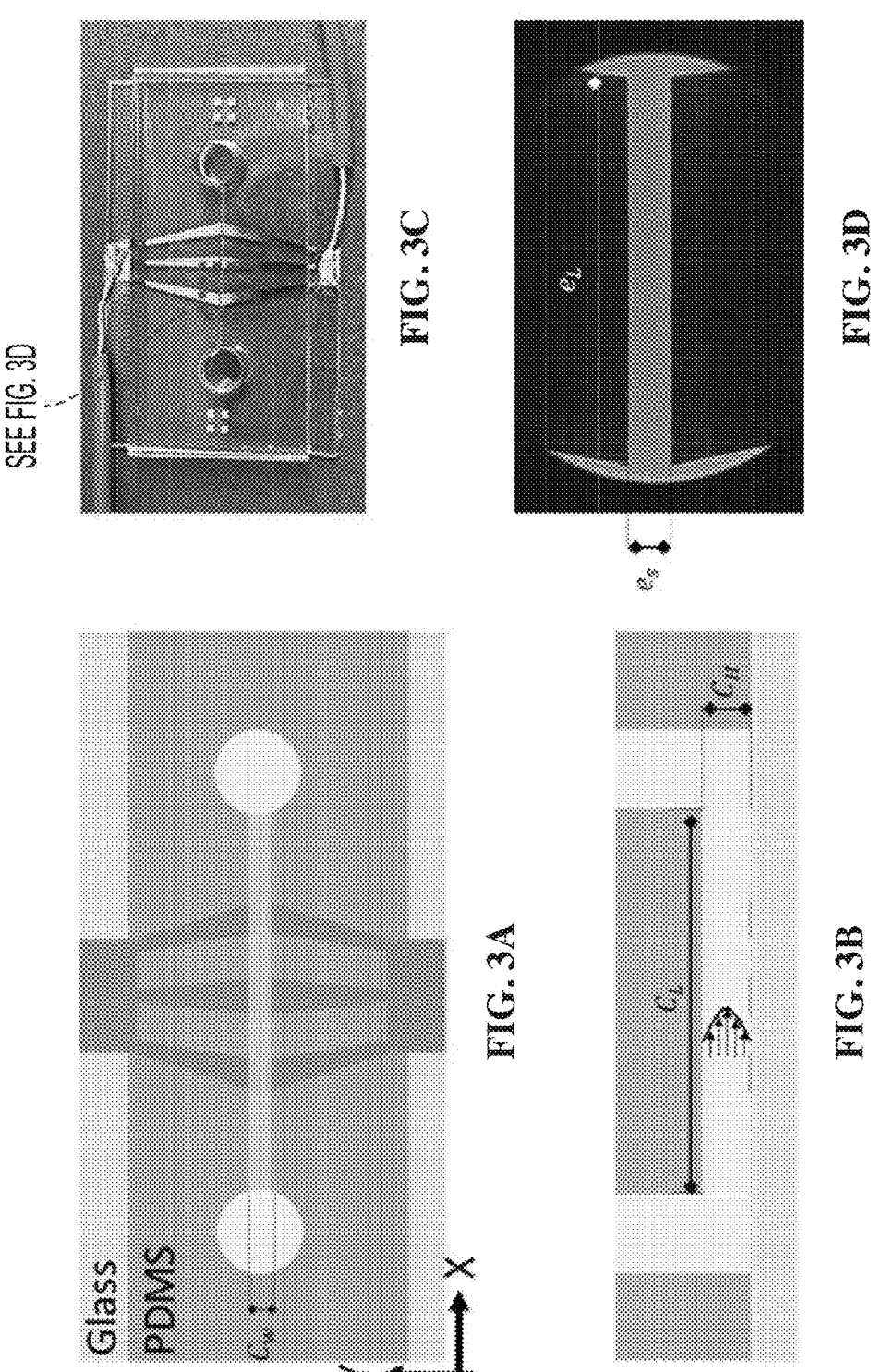
FIGS. 3A-3D provide an illustrative schematic representation of a transverse AC electrophoresis (TrACE) device.
Figure 4:
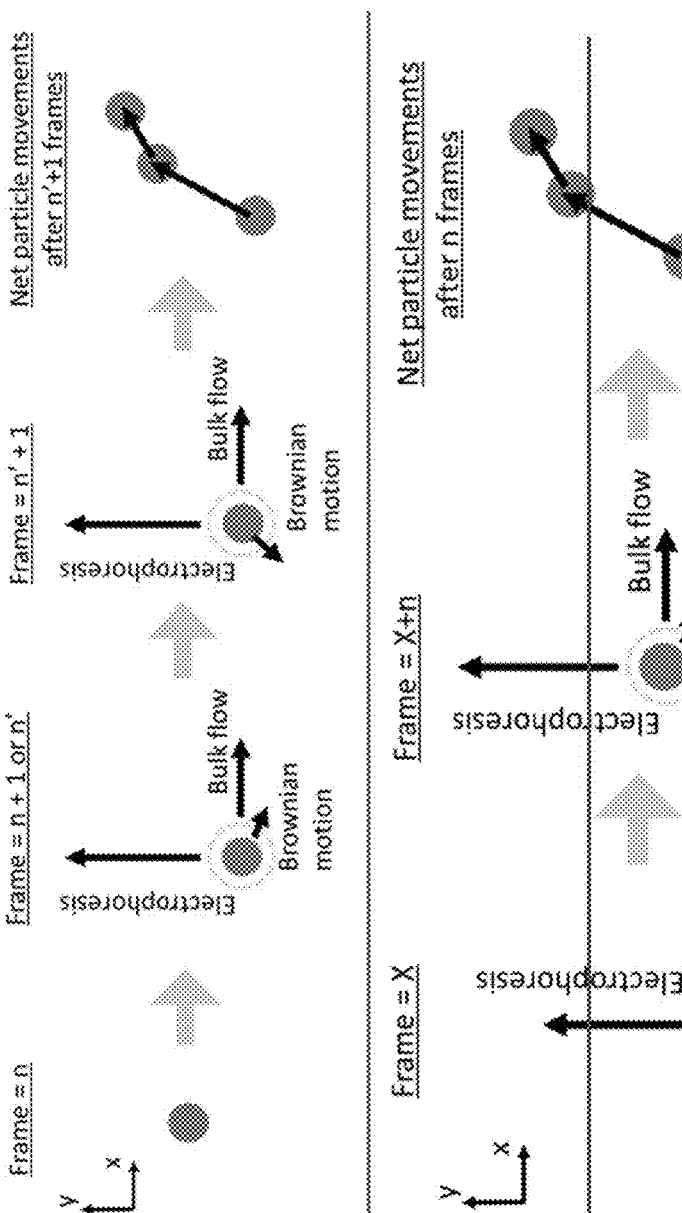
FIG. 4 provides an illustrative schematic representation of the forces acting on a particle and the movement of a particle.

TrACE microfluidic devices have a simple design, making them easy to fabricate as they require only a single microchannel and a pair of opposing electrodes (FIGS. 3A-3D). Although three pairs of electrodes are shown in FIG. 3A, only one pair is required. Devices with three pairs of electrodes were fabricated for improved fabrication efficiency, to compare the performance of electrode pairs, and to provide adequate surface area for adhesion of the PDMS layer to the glass substrate. The pair of opposing electrodes creates an electric field perpendicular to the bulk flow through the microchannel. A low-frequency AC is applied to these electrodes, forcing charged particles to move through the microchannel with an oscillating trajectory. The spatial movements of the particles are a summation of the three phenomena: electrophoresis, bulk flow, and Brownian motion. PTV records the net particle displacement at a given frame (FIG. 4). With the TrACE device dimensions used here, an electric potential with an amplitude of only 1 V creates a higher electric field (approximately 100 V/cm) within the microchannel due to the proximity of the electrodes (100 µm). Applying an electric potential with an amplitude of 1 V avoids the complications of water hydrolysis, including bubble formation. Though applying higher potentials to increase the electric field strength is desirable, amplitudes above 2 V result in bubble formation within the microchannel.

FIGS. 3A-3D. Schematic representation of the device. Top (3A) and cross-sectional (3B) views represent the following dimensions: $c_w$=300 µm, $c_L$=11 mm, $c_H$=50 µm, and $e_s$=100 µm. In (3B), a parabolic profile of a hydrodynamic flow is shown to represent the variability in flow velocity along the channel height (2-dimension). The fabrication of the device is finalized by attaching wires to the bus electrodes on both sides of the microchannel (3C), and a microscopic image of the patterned electrodes show straight edges and electrodes that are parallel to each other (3D).

FIG. 4. Schematic representation of the forces acting on a particle and the movement of a particle. A net particle movement results from three phenomena acting on a particle (represented with a gray circle): electrophoresis in the y-direction, bulk flow in the x-direction, and Brownian motion. Because Brownian motion is random, the vector representing Brownian motion points in an arbitrary direction represented. The gray dotted line around the particle represents possible particle displacements (one sigma length) caused by Brownian motion. The framewise particle trajectories represent the sum of these forces.

Experimental measurement of particle trajectories as a function of frequency, amplitude, and phase lag and comparison with theoretical model.

The motion of individual particles is measured in the TrACE system when driven by a square or sine wave at different frequencies and amplitudes. Experimentally observed particles' responses to a square and sine wave are shown in FIGS. 5A-5D and 6, respectively. The experimental frequency, amplitude and phase of the particle trajectories are investigated and compared with the quasi-equilibrium theoretical model.

Figures 5A, 5B, 5C, 5D:
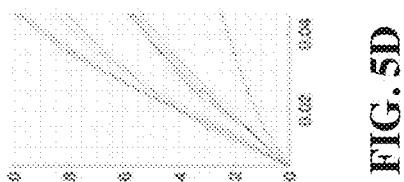
FIGS. 5A-5D provide illustrative particle response to different square waves.
Figure 6:
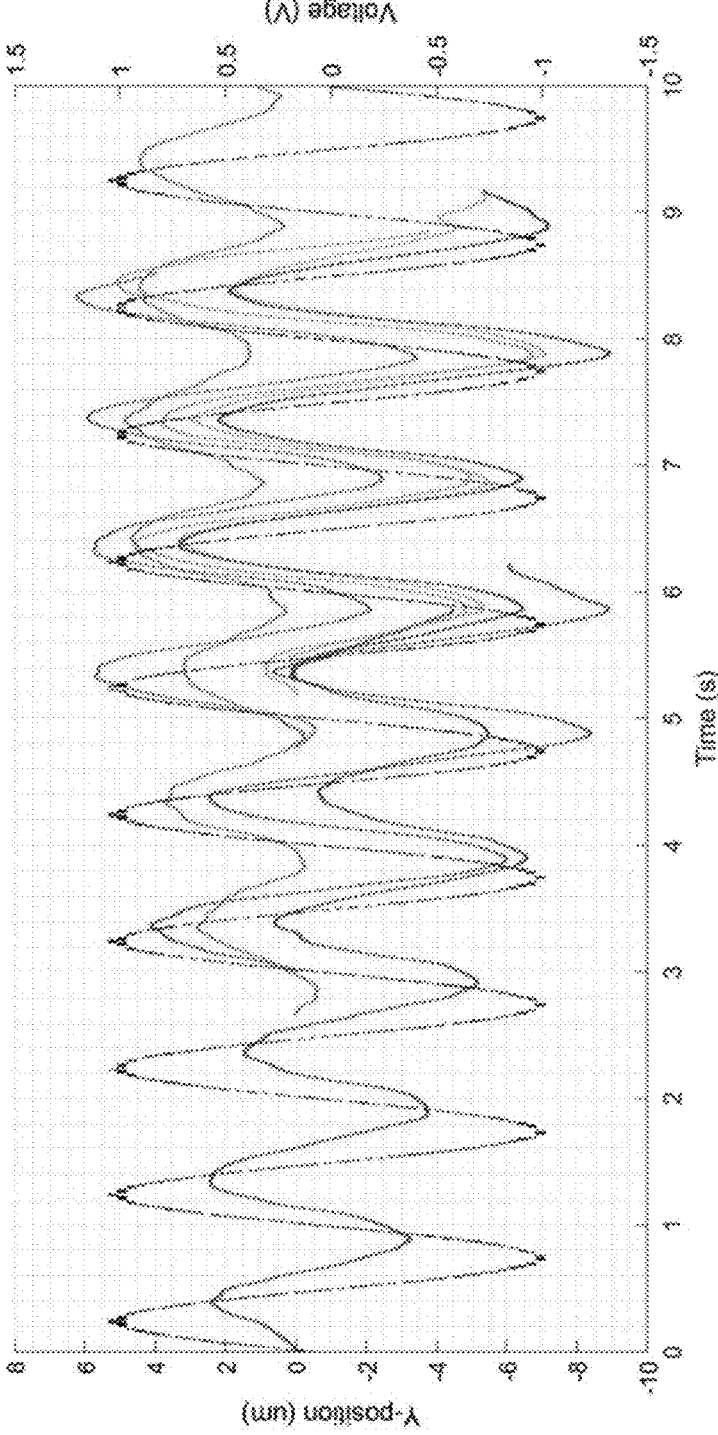
FIG. 6 provides illustrative particle response to a sine wave.
Figures 7A, 7B, 7C, 7D:
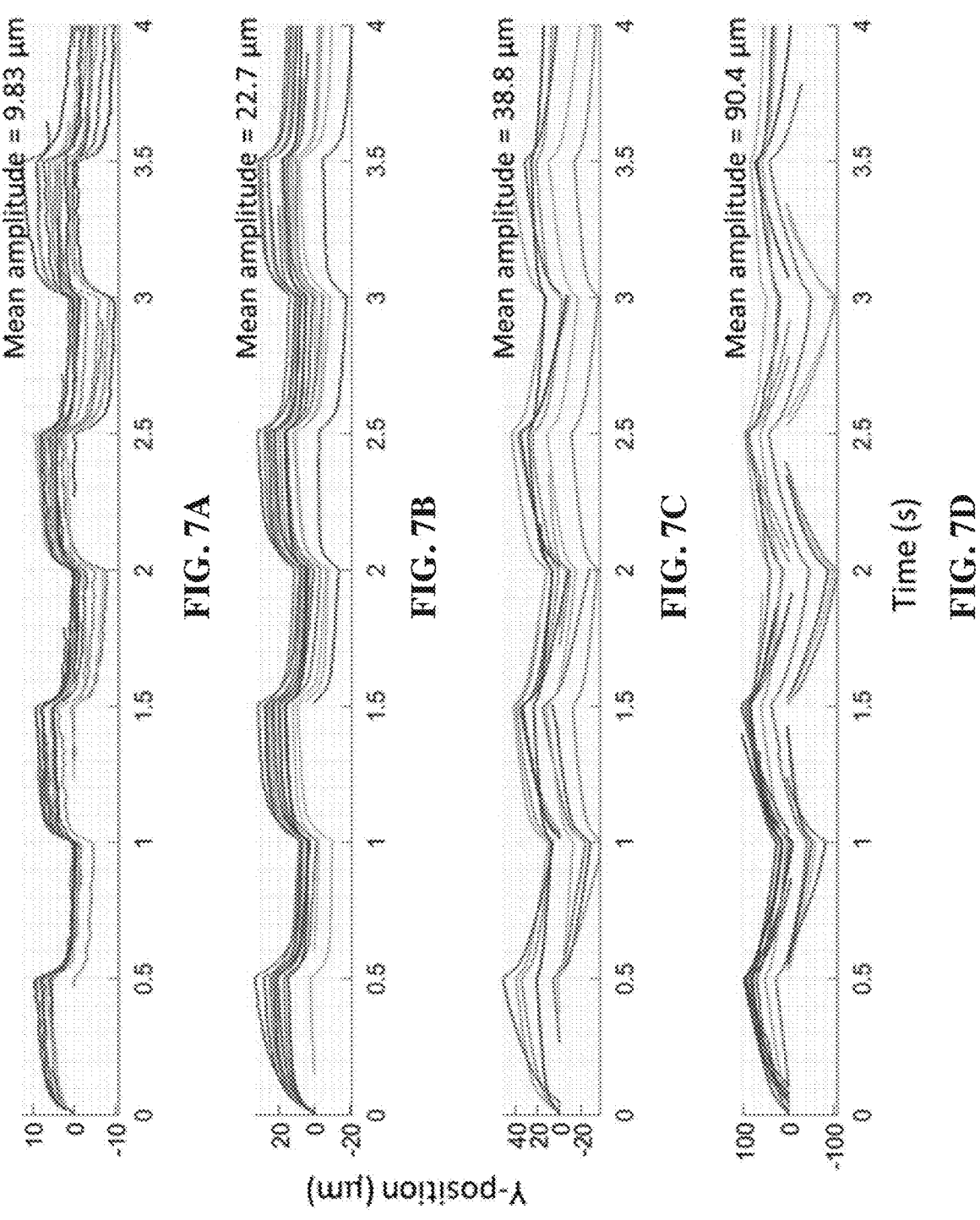
FIGS. 7A-7D provide illustrative particle response to electric waves with different amplitudes.

A direct correlation between the frequency of an applied electric field and the particle trajectories is observed. In other words, the oscillating frequency of the particles is the same as the frequency of the driving electric field wave. The response of particles to electric square waves with frequencies of 0.5, 1, or 5 Hz is shown in FIGS. 5A-5D. For example, when a 1 Hz sine wave is applied to the electrodes, all particles oscillate at 1 Hz as they travel down the microchannel (FIG. 6). Therefore, these experimental results show excellent agreement with the quasi-equilibrium model as the observed and predicted frequencies (FIGS. 1A-1F) are the same.

Additionally, a relation between the frequency of the electric field wave and the amplitude of the particle trajectories is observed experimentally. As the frequency of the applied potential increases, the amplitude decreases as the time for each particle excursion in the y-direction decreases, especially at higher frequencies (FIG. 5C). Likewise, this relation between the amplitude and frequency is shown in a quasi-equilibrium solution of the theoretical model (FIGS. 1A-1F). However, a deviation between the quasi-equilibrium model solution and experimental trajectories is observed that increases as the frequency decreases. Experimentally, for the square wave, the measured trajectories are not linear during each half wave cycle as predicted in FIGS. 1A-1C and FIGS. 2A-2C. As time progresses through each half-wave cycle the y-velocity decreases monotonically and begins to approach zero at 0.5 Hz (FIG. 5A). Thus, decreasing the frequency increases the half-wave period and increases the deviation from the solution of the quasi-equilibrium model (FIGS. 1A-1C). Electrode charging is a potential cause of this decreased amplitude with decreasing frequency, which can reduce the local electric field that drives particle motion. Without being bound to any particular theory, electrode charging can play a role because the voltages are below the potential for water hydrolysis, and charge transfer is presumed negligible.

Figure 11:
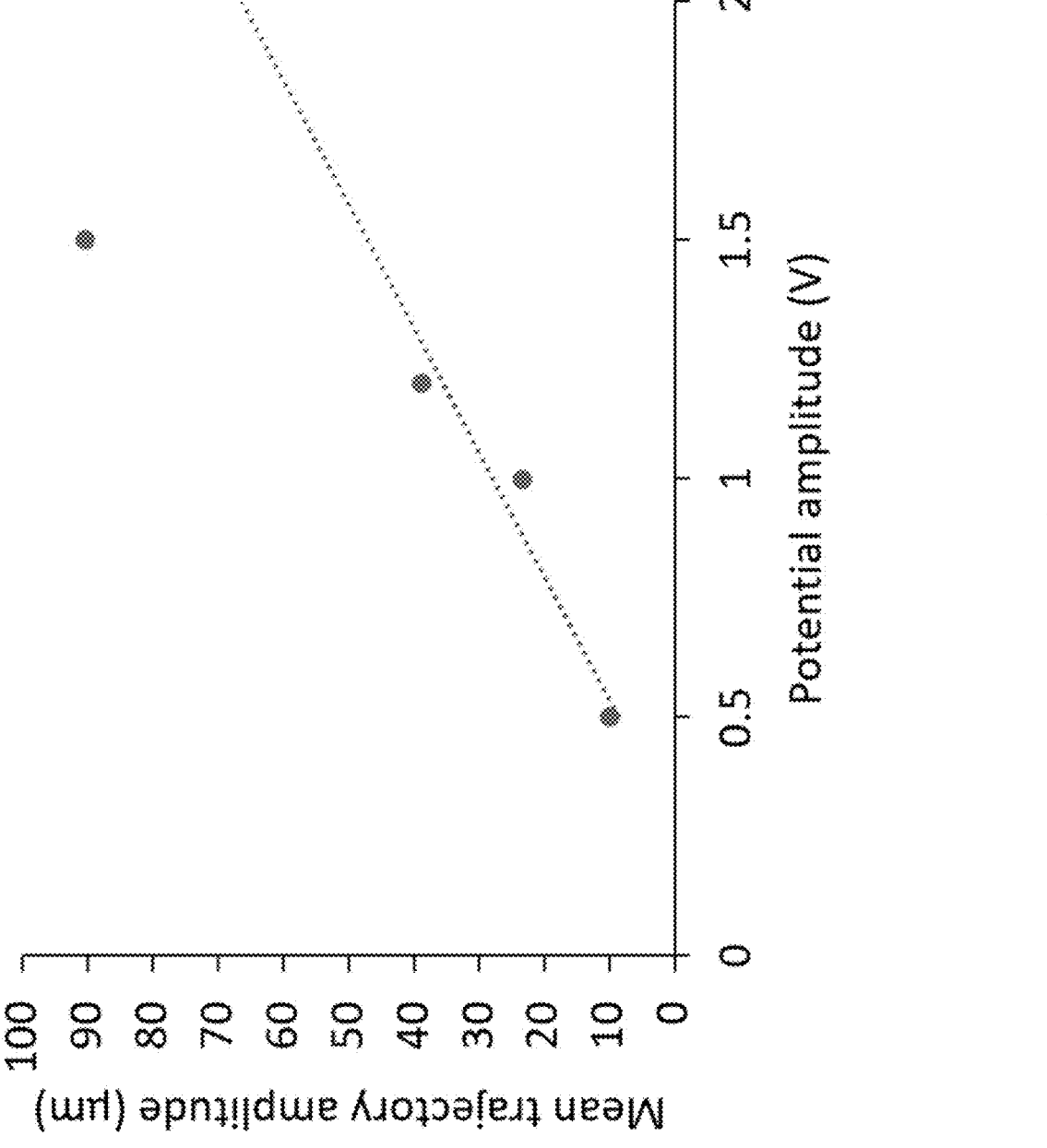
FIG. 11 provides illustrative mean trajectory amplitude as a function of potential amplitude.

The amplitude represents the strength of the electric field and force applied to the particles. A direct correlation between the amplitude of the electric potential and the amplitude of the particle trajectories is observed. As the amplitude of the electric potential increases from 0.5 V to 1.5 V, the amplitude of the particle trajectories, calculated by the first and last points of each half cycle of trajectories, increases due to the greater electric force applied to each particle during the cycle (FIGS. 7A-7D). Results from potentials below the redox threshold (0.5, 1, and 1.2 V) agrees with the quasi-equilibrium solution (FIGS. 2A-2D) that also predicts that the amplitude of the particle oscillation is directly proportional to the amplitude of the electric field wave. However, as the electric potential increases to 1.5 V, above the redox threshold potential, the amplitude enhancement exceeds the linear relationship at lower voltages (FIG. 11). Although a reference electrode is not used in the device, recorded particle trajectories show the electric potential threshold where the mechanism for particle migration changes from electrode charging to charge transfer. Applying a high amplitude of the electric wave can be desirable to maximize the amplitude of the particle trajectory for ease of detection with the tradeoff of bubble formation and Joule heating in the channel. However, the amplitude of particle movement is often physically bounded by the distance between the electrodes, which is 100 μm in this device.

The particle trajectories are also examined to determine if a measurable phase lag is observed. The inertial response constant is defined by the ratio between the particle's mass and Stoke's drag force, $$\tau = \frac{m}{3\pi D \eta},$$

indicating that the inertial response should be on the order of 10 nanoseconds for a 1 μm particle which is six orders of magnitude faster than the 0.01 s period between each frame. To start the electric field wave and the function generator simultaneously, a synchronizer triggered both the camera and the function generator that applied the electric field wave. Experimentally no phase lag is observed (FIGS. 5A-5D), which is consistent with an inertial time constant on the order of 10 ns. In the case of a sine wave, the phase difference between the electric field wave and particle trajectories is ¼ of a wave (FIG. 6), consistent with the solution of the theoretical model (FIGS. 1D-1F). Although this may be perceived as a phase lag, when the applied electric field has the shape of a sine wave, then the particle trajectories have the shape of a cosine, which is consistent with the particles moving the fastest when the forcing by the electric field is the strongest. For the square wave, the electric field changes abruptly, and the change in particle trajectory is immediate and just as abrupt as the change in the electric field wave. One interesting feature of the square wave is that although the particles respond immediately, the greatest velocity is measured between frames 2 and 3 or from 0.025 to 0.035 s, as shown in the inset of FIG. 5D. In summary, no measurable phase lag is observed.

FIGS. 5A-5D. Experimental particle response to different square waves. Trajectories of carboxyl functionalized polystyrene microparticles with a nominal diameter of 1.9±0.095 μm are recorded. The individual traces show trajectories of individual beads with different electrophoretic mobilities while the black trace is the applied voltage. The following conditions were applied: 1 V amplitude square wave at a frequency of 0.5 Hz (5A), 1 Hz (5B), and 5 Hz (5C). Images were taken at 100 fps for 4 s. Y-positions of each particle were recorded and plotted along the left y-axis, and the measured voltage is plotted along the right y-axis over time. The first five points of each particle trajectory when 5 Hz is applied are shown in the inset.

FIG. 6. Experimental particle response to a sine wave. Trajectories of carboxyl functionalized polystyrene microparticles with a nominal diameter of 1.9±0.095 μm are shown. A sine wave with an amplitude of 1 V at 1 Hz frequency is applied to TrACE and images were taken at 100 fps for 10 seconds. The individual traces with different colors show trajectories of different beads with different electrophoretic mobilities on the left y-axis, while the black trace is the applied voltage on the right y-axis.

FIGS. 7A-7D. Particle response to electric waves with different amplitudes. Trajectories of carboxyl functionalized polystyrene microparticles with the nominal diameter of 1.9±0.095 μm. An external square wave with an amplitude of 0.5 (7A), 1 (7B), 1.2 V (7C) and 1.5 V (7D) at 1 Hz frequency was applied and images were taken at 100 fps for 4 seconds.

Ideally, in a TrACE device, the electric field is homogenous, so all particles experience the same electric field regardless of their positions in the microchannel. However, in this first version of the device, the micropatterned electrodes are on the substrate surface; the divergence of the electric field increases as the height about the device substrate increases along the z-axis. To quantify the variation in the electric field that the particles experience as a function of the y,z-position, the electric field across the microchannel cross section is modeled numerically. We analyze the electric field at ¼ and ¾ of the wave where the magnitude of the applied potential is greatest. Here, we discuss our findings at a quarter wave as the three-quarters results are similar in the opposite direction.

To reduce the effects of wall interactions in these initial analyses, we focused only on the region near the center of the microchannel. The electric field variation along the channel width (y-axis) as a function of the z-axis becomes more critical as the particles travel transversely due to the applied potential. During each wave cycle, the particles travel up to 20 μm from the microchannel center (for amplitudes ≤1.0 V), mainly within a single x,y-plane. Suppose the particle remains within the plane centered at the microchannel half-height (25 μm). In that case, the electric field strength remains fairly uniform (decreasing less than 1%) as the particle moves up to 20 μm from the microchannel center (FIG. 8). If the particles do not remain at the same height, the change in the strength of the electric field alters the electrophoretic forcing on the particle, which causes an equivalent alteration in the electrophoretic velocity. For example, the electric field numerical analysis indicates that a particle at 12.5 μm will travel about 3% faster than an identical particle at 25 μm above the microchannel bottom.

For the non-confocal fluorescence imaging system, the particle must move more than the +/−4 μm from the focal plane to appear out of focus. Thus, deviations of the initial particle positions and displacement caused by Brownian motion from the focal plane will not be apparent. Experimentally, particles in focus are only analyzed to keep the consistent z-positions, although inconspicuous displacements from the focal plane can contribute to the distribution of measured electrophoretic velocities due to the change in electric field strength. A homogenous electric field within the microchannel can be achieved by fabricating vertical electrodes along the microchannel wall in TrACE. More consistent electrophoretic velocities are expected regardless of the particle's z-position in a homogenous electric field. Without being bound to any particular theory, with the development of the 3D PTV technique a direct measurement of particle's z-positions in a microchannel can improve the precision of measurements in a system like TrACE.

FIG. 8. Electric field inhomogeneity. A finite element analysis model of microchannel cross-sectional to quantify the variation in electric field along the z-axis height. The width and height of the microchannel is 300 μm and 50 μm respectively, and the electrodes are 100 μm apart from one another on top of the glass substrate. We focus on quantifying the divergence in the electric field in the middle of the microchannel as we only analyze the particles traveling within this region experimentally. The plot is computed with boundary conditions of one electrode at 1 V and the other at ground.

Brownian motion imparts random motion in all 3 dimensions. Specifically, the effects of Brownian motion along the z-axis on a particle velocity in x and y-dimensions are considered. Brownian motion in the z-dimension can alter the velocity of the particle along the x-axis due to the parabolic profile of the hydrodynamic flow along the channel height (FIG. 3B) and change the particle trajectory. One-dimensional displacements caused by Brownian motion are estimated from diffusion lengths for a range of particles sizes (Table S1). During a particle's residence in the detection window of ~4 s, most particles with a diameter of 1 μm travel within one sigma diffusion length (1.85 μm) along the z-axis due to Brownian motion. As the particle size increases, the diffusion length decreases (Table S1) and the diffusive variance in the particle trajectory decreases. Additionally, Brownian motion along the z-axis can alter the particle's velocity along the y-axis due to the variation in the electric field strength along the channel height. In the numerical analysis, about 1% variation in the magnitude of the electric field is calculated as the channel height changes from 2.5 to 5 μm (FIG. 8). Therefore, even less than 1% variation in the electric field strength is expected for a particle traveling within a one sigma diffusion length less than 2 μm.

Although Brownian motion pushes particles randomly in the y-direction, electrophoresis is the primary force driving the particle motion in the y-dimension. Thus, the ratio between the electrophoretic motion and Brownian motion plays a key part in making a precise electrophoretic mobility measurement. Changes in particles' positions between frames caused by Brownian motion are measured using suspended particles in an aqueous solution inside the microchannel in TrACE. The measured displacements from Brownian motion follow a normal distribution, and one sigma length from the center is calculated to define the experimental diffusion length. Since the measured diffusion length of particles is larger than the expected diffusion length from Brownian motion, the contribution from measurement noise is determined (Table 1). PTV analysis is performed on a control with stationary particles captured in PDMS to isolate the measurement noise from instrumentations. Particle displacements caused by Brownian motion only can be determined by subtracting $\sigma_{Measurement\ noise}$ from $\sigma_{Spatial\ fluctuations}$. For small particles (0.53 and 1 μm), measured particle displacements from Brownian motion fall within their respective theoretical diffusion lengths. However, for large particles (2 μm), particle displacement caused by Brownian motion is no longer measurable as the magnitude of noise overwhelms and is also similar to the theoretical diffusion length. Overall, the magnitude of the imprecision of the trajectory from the noise is less than the contribution from Brownian motion. However, the ratio of magnitudes of Brownian motion to noise increases as the particle size increases and can further affect the precision of electrophoretic mobility measurements. Further studies of the main contributors to noise are likely to reveal improved strategies for noise reduction.

In TrACE, the electrophoretic mobility can be determined from the particle trajectories, while the cycling of the wave increases the measurement time. As noted in FIGS. 5A-5D, the time-dependent trajectories are not linear, but are nearly linear at the onset of each voltage transition in the square wave. Given the time-dependent velocity after each half-wave electric field transition, one fairly simple approach is to calculate the electrophoretic mobility from the maximum particle y-velocity that is measured after the electric field changes direction. This study uses the 1 V and 1 Hz square wave data to calculate the electrophoretic mobility of 0.53, 1, and 2 μm particles (Table 1). The uncertainty in the measurement of particle trajectory inherently limits the precision of the electrophoretic mobility measurements. Fundamentally, the precision of the electrophoretic mobility measurement is limited by Brownian motion, which increases with decreasing particle size. Additional sources of noise also increase the uncertainty of the particle trajectory that has been referred to as noise previously. Aside from measurement noise, the sources of additional noise include imprecision in the determination of the particle center, inhomogeneity of the electric field, and variation in the bulk flow as a function of position within the microchannel. To improve precision, multiple reads of the electrophoretic mobility are averaged for the 0.5, 1, and 5 Hz data (Table 2). Higher frequencies better utilize the residence time of the particles within the detection window by forcing particles to oscillate more quickly and allowing for more reads. An electrophoretic mobility calculation is made for each particle upon each change in the direction of the electric field.

Figure 10:
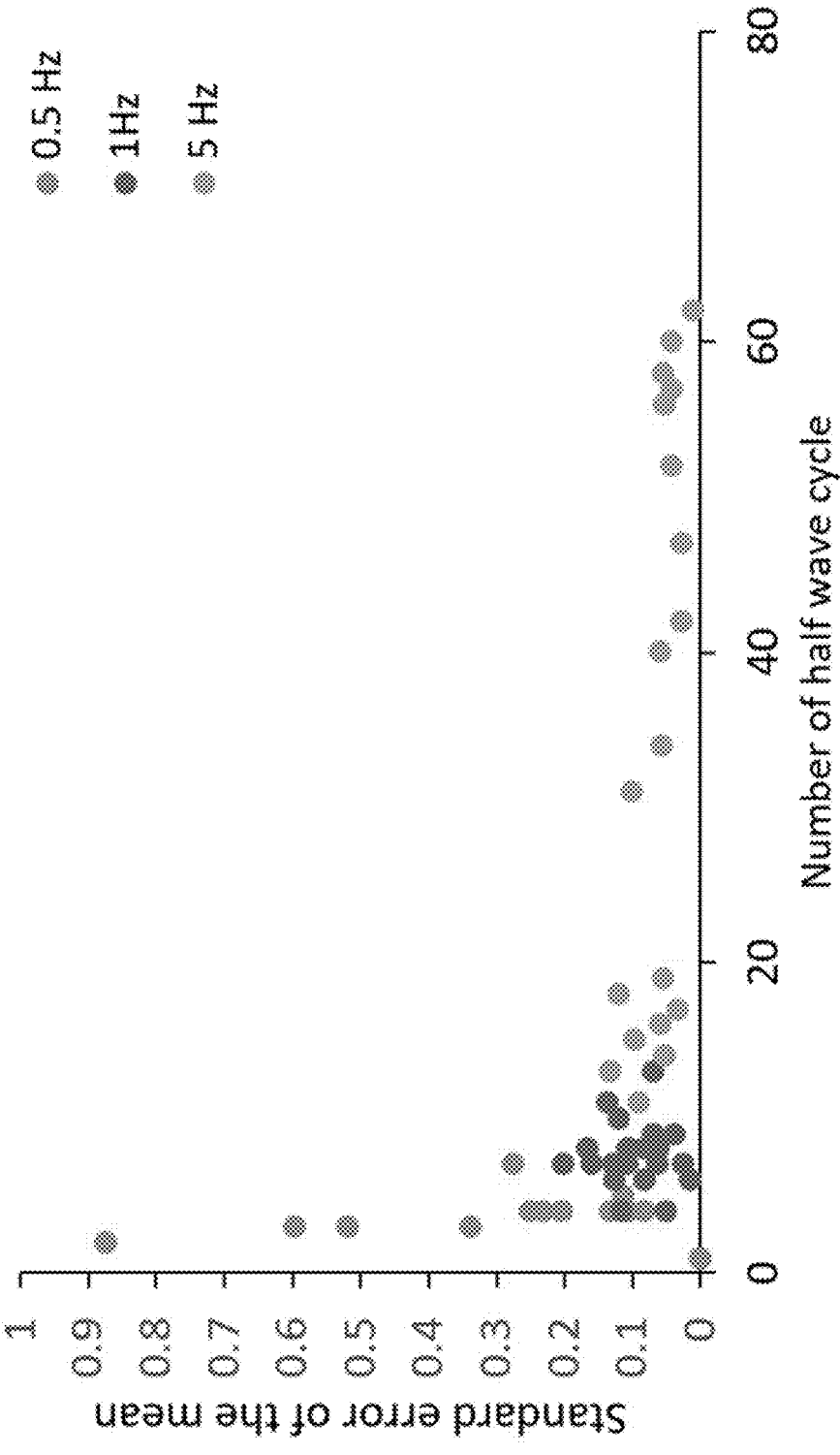
FIG. 10 provides an illustrative relation between standard error of the mean and the number of half wave cycles.

Therefore, the number of reads equals the number of half-wave cycles over which the particle is tracked. The precision of the electrophoretic mobility measurement, as indicated by the average of the standard error of the mean, improves about the square root of the number of half-wave cycles as the frequency increases (Table 2) with expected outliers (FIG. 10). The bulk electrophoretic mobility of the 2 μm used in these experiments was also measured with the Malvern Zetasizer and calculated at 4.881±0.310 μmcm/Vs. A relative standard deviation (RSD) of ~6% is observed in the sample population measured using a Zetasizer. At 5 Hz, the TrACE system can measure a particle's electrophoretic mobility at a slightly improved RSD of ~5%.

TABLE 1

Electrophoretic mobilities of different sized particles and noise measurements. Mean electrophoretic mobility and standard deviation of the particle population of different sized particles (nominal diameters reported by manufacturers) are calculated from mean electrophoretic mobility of an individual particle based on its trajectory. $\sigma_{Spatial\ fluctuation}$ is the sum of the Brownian motion and the measurement noise. $\sigma_{Measurement\ noise}$ is the measurement noise. Diffusion lengths are calculated for the time period between each frame which is 0.01 s.

| | | | |
|---|---|---|---|
| Nominal diameter (μm) | 0.53 ± 0.013 | 1 ± 0.016 | 1.9 ± 0.095 |
| Number of particles tested | 37 | 33 | 21 |
| Mean $\mu_{ep}$ (μmcm/Vs) | 1.742 ± 0.280 | 2.625 ± 0.110 | 2.639 ± 0.135 |
| $\sigma_{Spatial\ fluctuation}$ (μm) | 0.135 ± 0.028 | 0.110 ± 0.076 | 0.099 ± 0.061 |

TABLE 1-continued

Electrophoretic mobilities of different
sized particles and noise measurements.
Mean electrophoretic mobility and standard
deviation of the particle population of different
sized particles (nominal diameters reported by manufacturers)
are calculated from mean electrophoretic
mobility of an individual particle based on its trajectory.
$\sigma_{Spatial\ fluctuation}$ is the sum of the
Brownian motion and the measurement noise.
$\sigma_{Measurement\ noise}$ is the measurement noise.
Diffusion lengths are calculated for the time
period between each frame which is 0.01 s.

| | | | |
|---|---|---|---|
| $\sigma_{Measurement\ noise}$ (μm) | 0.016 ± 0.015 | 0.036 ± 0.018 | 0.068 ± 0.044 |
| Theoretical diffusion length (μm) | 0.128 | 0.092 | 0.66 |

TABLE 2

Population electrophoretic mobility measurements at different
frequencies. Electrophoretic mobilities of the population
of same nominal size (2 μm) particles are reported from
averaging all single particles electrophoretic mobility measurements
taken at different frequencies. The mean number of measurements
taken per particle is reported for each frequency. Standard
error of the mean is calculated by dividing the standard deviation
by the square root of the number of half wave cycles for each
particle and the mean of all standard error of the mean is
reported for each frequency.

| | | | |
|---|---|---|---|
| Frequency (Hz) | 0.5 | 1 | 5 |
| Mean $\mu_{ep}$ (μmcm/Vs) | 2.429 | 2.639 | |
| Number of particles tested | 14 | 21 | 20 |
| Mean number of $\mu_{ep}$ measurements per particle | 3.5 | 7.6 | 35.9 |
| Standard error of the mean | 0.267 | 0.097 | 0.061 |

Figure 12:
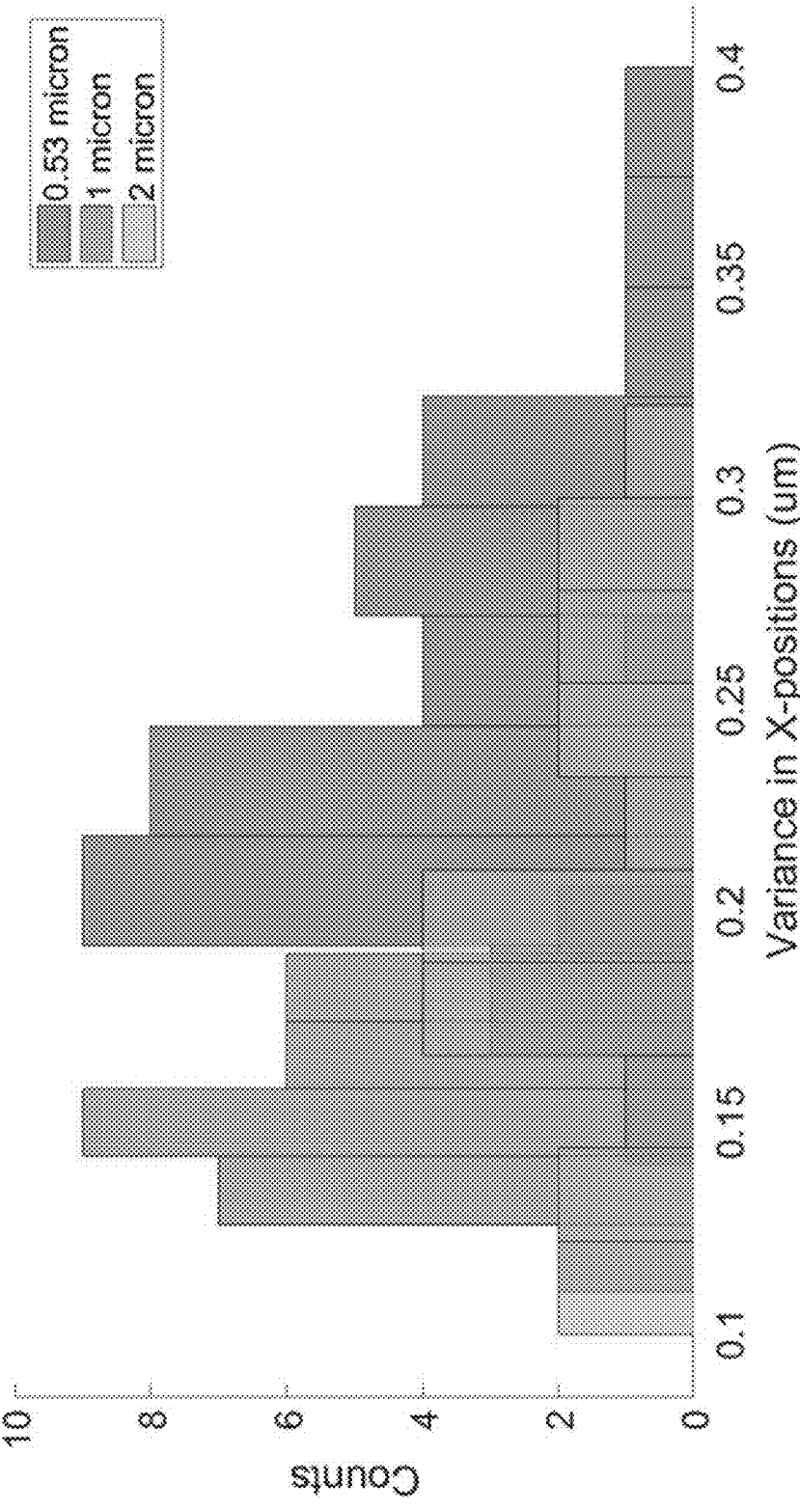
FIG. 12 provides illustrative measured variance in particles' x-positions.
Figures 13A, 13B:
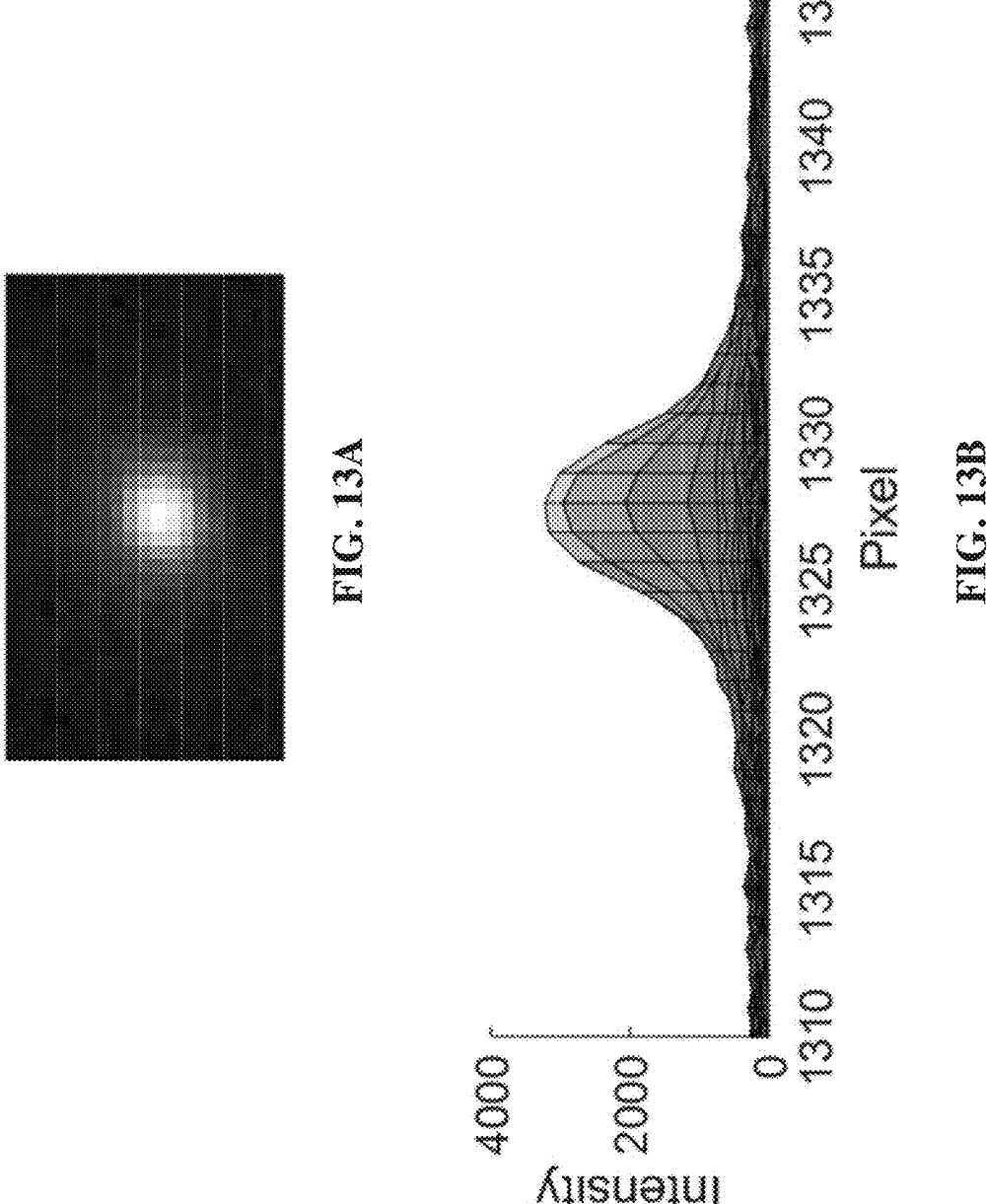
FIGS. 13A-13B provide illustrative particle sizing analysis for 2 micrometer particles.

Two approaches are used in TrACE for particle size analysis, which provides a platform for size measurements over a wider range of particle sizes. Brownian motion measured by diffusion lengths or velocity fluctuations in the x-direction from PTV analysis provides size information for small particles. For large particles (diameters above 2 μm) where Brownian motion is not measurable, imaging analysis is used for size measurements. The histogram of measured diffusion lengths shows two distinct peaks at 0.25 and 0.16 μm for 0.53 and 1 μm particles, respectively (FIG. 12). As expected, measured diffusion lengths decrease as the particle size increases. Particle sizes are not directly calculated from diffusion lengths; however, particle populations can be differentiated by two distinct distributions. In TrACE, the velocity variances of individual particles are extracted from particle trajectories recorded by PTV analysis to directly measure particle size. Although additional noise and hydrodynamic flow increases velocity variance and decrease the measured particle sizes, reducing noise improves the precision of size measurements. For 2 μm particles where the magnitude of excess noise is as large as Brownian motion, image analysis is a better particle size analysis option (FIGS. 13A-13B). A mean particle diameter measured based on intensities above a threshold value is about twice as large (5.78±1.18 μm) as the nominal diameter of 1.9±0.095 μm particles. Often, particles imaged with non-confocal fluorescence microscopy can appear larger due to the longer wavelength of the light source, focal plane, light scattering, etc. Overall, calibration using the standards in both approaches can expand the particle sizing capability of TrACE.

One of the main drawbacks of a single-particle measurement is in a small sample size as most single-particle measurement methods typically measure one particle at a time and require a low seeding density. While the linear bulk flow in this first report is fairly low, the TrACE system is capable of multiplexing as many particles that can be in the field of view and tracked simultaneously. For example, the trajectories of 5 particles are tracked simultaneously in FIG. 9. The limitation in the number of particles that can be analyzed simultaneously depends mainly on the frequency of crossovers between neighboring particle trajectories and has not yet been explored fully. The PTV algorithm and particle seeding density can be finely tuned to reduce the frequency of crossovers to increase the number of particles studied.

Figure 9:
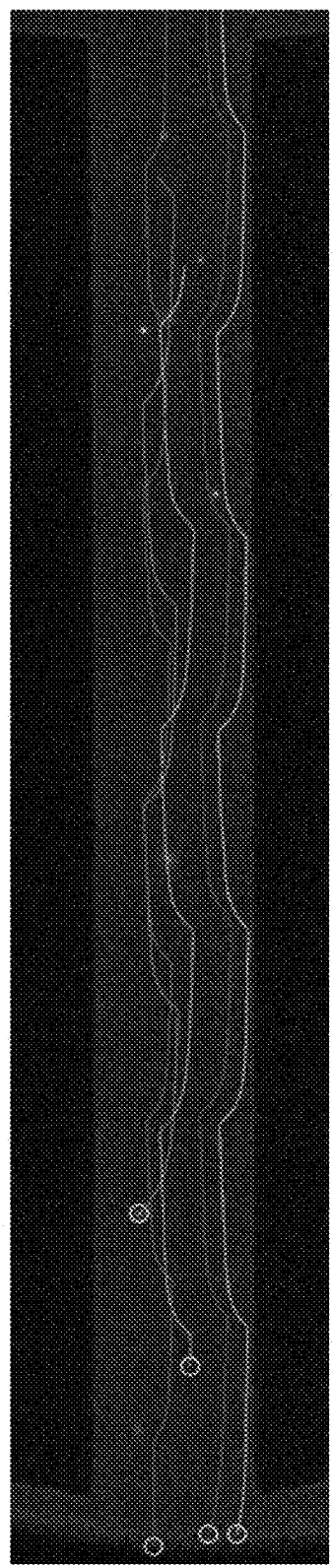
FIG. 9 provides illustrative trajectories of multiple particles in a detection window.

FIG. 9. Multiple particles' trajectories in the detection window. Five particles are tracked simultaneously as the particles oscillate across the microchannel under applied external square wave with an amplitude of 1 V and 1 Hz frequency. The white circles illustrate their initial relative spatial orientations, which maintain relatively constant throughout. The detection window defined by the length of electrodes is 1 mm.

In TrACE, particle motion in the x-dimension is driven by the hydrodynamic flow and can be controlled independently from the particle's electrophoretic motion. The bulk flow rate can be varied by simply changing the height of the liquids in inlet and outlet reservoirs. Easy control over the bulk flow rate has many benefits. By slowing the bulk flow, particle's residence time in the detection window increases and each particle oscillates across the width of the channel more times, resulting in more data collection for each particle. An average taken with an increased number of measurements can improve precision. On the other hand, increasing the bulk flow allows more particles to be analyzed and increases throughput.

We describe a new microfluidic TrACE system to measure the electrophoretic mobility of single particles using PTV. The TrACE system has unique performance characteristics or attributes for single particle measurements: simultaneous electrophoretic mobility and size measurements, a long observation time, and multiplexing capability. A low bulk flow velocity and long detection window provide a longer observation time to increase measurements for improved precision. Compared with DC free zone electrophoresis, electromigration and bulk flow are decoupled, and the contribution of longitudinal EOF to migration is eliminated. Multiplexing via simultaneous tracking of multiple particle trajectories in the detection window alleviates low particle throughput. A simple design of the TrACE device allows for low-cost fabrication, and applying a low-potential electric wave provides several benefits during device operations, such as avoiding bubble formation and excessive heat generation. Another novel aspect of the TrACE device includes creating a high electric field that is desirable for electrophoresis while applying a low potential by placing electrodes close to each other. Optical microscopy used in the TrACE system provides a high spatial resolution and allows for direct measurements of the particles and the possible detection of aggregates. The precision of the single particle electrophoretic mobility measurements can be improved by understanding the relation between the electrophoretic velocity and a particle's physical characteristics in a low-frequency AC electric field, creating a more homogenous electric field within a microchannel, and increasing the number of measurements via the frequency of the electric wave and frame rate of image acquisition. Overall, the combination of AC electrophoresis and single-particle imaging has the potential to characterize biological particles, specifically cells and bacteria, as the interest in describing biological particles grows each day.

SI TABLE 1

Diffusion coefficient and diffusion length was calculated using the Stokes-Einstein relationship for spherical particles and diffusion length equation, respectively, for different particle sizes. Calculated diffusion length was for 4 seconds to match the typical residence time of a particle within the detection window.

| Particle size ($\mu$m) | Diffusion coefficient ($m^2$ $s^{-1}$) | Diffusion length ($\mu$m) |
|---|---|---|
| 0.1 | 4.32 E−12 | 5.88 |
| 1 | 4.32 E−13 | 1.86 |
| 10 | 4.32 E−14 | 0.59 |

SI TABLE 2

Mean electrophoretic mobility of a single particle. An average electrophoretic mobility of 2 $\mu$m particles under a square wave with an amplitude of 1 V at 0.5 Hz is calculated for a single particle. An average is taken based on the number of half wave cycles that each particle is subjected to.

| Frequency (Hz) | Particle | (Mean $\mu_{ep}$ ($\mu$mcmV$^{-1}$s$^{-1}$) | SD | Number of half wave cycle |
|---|---|---|---|---|
| 0.5 | 1 | 1.618 | 0.503 | 4 |
| | 2 | 1.392 | 0.587 | 3 |
| | 3 | 2.631 | 1.036 | 3 |
| | 4 | 2.188 | 1.236 | 2 |
| | 5 | 1.924 | 0.268 | 4 |
| | 6 | 2.782 | 0.209 | 4 |
| | 7 | 2.469 | N/A | 1 |
| | 8 | 2.927 | 0.464 | 4 |
| | 9 | 2.591 | 0.257 | 5 |
| | 10 | 2.122 | 0.901 | 3 |
| | 11 | 1.635 | 0.166 | 4 |
| | 12 | 3.574 | 0.410 | 4 |
| | 13 | 3.000 | 0.729 | 7 |
| | 14 | 3.159 | N/A | 1 |

SI TABLE 3

Mean electrophoretic mobility of a single particle. An average electrophoretic mobility of 2 $\mu$m particles under a square wave with an amplitude of 1 V at 1 Hz is calculated for a single particle. An average is taken based on the number of half wave cycles that each particle is subjected to.

| Frequency (Hz) | Particle | (Mean $\mu_{ep}$ ($\mu$mcmV$^{-1}$s$^{-1}$) | SD | Number of half wave cycle |
|---|---|---|---|---|
| 1 | 1 | 2.904 | 0.174 | 8 |
| | 2 | 2.009 | 0.384 | 10 |
| | 3 | 2.659 | 0.252 | 13 |
| | 4 | 2.388 | 0.534 | 7 |
| | 5 | 2.235 | 0.168 | 7 |
| | 6 | 2.773 | 0.103 | 4 |
| | 7 | 2.781 | 0.234 | 4 |
| | 8 | 2.393 | 0.303 | 8 |
| | 9 | 2.677 | 0.284 | 7 |
| | 10 | 2.510 | 0.295 | 8 |
| | 11 | 2.147 | 0.212 | 9 |
| | 12 | 2.525 | 0.470 | 8 |
| | 13 | 1.834 | 0.341 | 7 |
| | 14 | 2.711 | 0.308 | 6 |
| | 16 | 3.321 | 0.201 | 6 |
| | 17 | 3.206 | 0.425 | 7 |
| | 18 | 3.292 | 0.231 | 8 |
| | 19 | 2.837 | 0.114 | 9 |

SI TABLE 3-continued

Mean electrophoretic mobility of a single particle. An average electrophoretic mobility of 2 $\mu$m particles under a square wave with an amplitude of 1 V at 1 Hz is calculated for a single particle. An average is taken based on the number of half wave cycles that each particle is subjected to.

| Frequency (Hz) | Particle | (Mean $\mu_{ep}$ ($\mu$mcmV$^{-1}$s$^{-1}$) | SD | Number of half wave cycle |
|---|---|---|---|---|
| | 20 | 3.093 | 0.456 | 11 |
| | 21 | 2.210 | 0.070 | 7 |

SI TABLE 4

Mean electrophoretic mobility of a single particle. An average electrophoretic mobility of 2 $\mu$m particles under a square wave with an amplitude of 1 V at 5 Hz is calculated for a single particle. An average is taken based on the number of half wave cycles that each particle is subjected to.

| Frequency (Hz) | Particle | (Mean $\mu_{ep}$ ($\mu$mcmV$^{-1}$s$^{-1}$) | SD | Number of half wave cycle |
|---|---|---|---|---|
| 5 | 1 | 1.901 | 0.234 | 16 |
| | 2 | 1.523 | 0.182 | 42 |
| | 3 | 1.710 | 0.243 | 19 |
| | 4 | 2.572 | 0.479 | 13 |
| | 5 | 1.694 | 0.331 | 34 |
| | 6 | 1.617 | 0.380 | 15 |
| | 7 | 2.624 | 0.300 | 11 |
| | 8 | 2.506 | 0.083 | 62 |
| | 9 | 2.732 | 0.198 | 14 |
| | 10 | 2.535 | 0.404 | 56 |
| | 11 | 2.351 | 0.396 | 56 |
| | 12 | 2.194 | 0.332 | 60 |
| | 13 | 2.463 | 0.421 | 58 |
| | 14 | 2.351 | 0.560 | 31 |
| | 16 | 1.434 | 0.142 | 17 |
| | 17 | 2.449 | 0.310 | 52 |
| | 18 | 2.261 | 0.316 | 57 |
| | 19 | 2.375 | 0.372 | 40 |
| | 20 | 2.458 | 0.512 | 18 |

FIG. 10. Relation between standard error of the mean and the number of half wave cycles. A standard error of the mean of electrophoretic mobility of each particle is plotted against the number of half wave cycles that particle was subjected to.

FIG. 11. Mean trajectory amplitude as a function of potential amplitude. A linear relationship is shown for mean trajectory amplitude at 0.5, 1, and 1.2 V. At 1.5 V, there is a significant increase in mean trajectory amplitude.

FIG. 12. Measured variance in particles' x-positions. Particle displacements in the x-directions caused by Brownian motion is calculated for 0.53, 1, and 2 $\mu$m particles and plotted as a histogram. Two distinct peaks of the distributions are observed for 0.53 and 1 $\mu$m particle population.

FIGS. 13A-13B. Particle sizing analysis for 2 $\mu$m particles. From a raw image of a particle (13A), intensity for each pixel is determined and intensity value above background threshold is used to determine a diameter (13B).

Figure 14A:
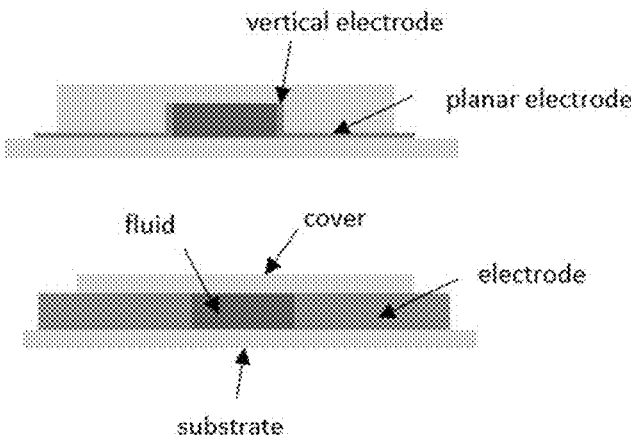
FIG. 14A provides an illustrative diagram for electrode design in the TrACE device.
Figure 14B:
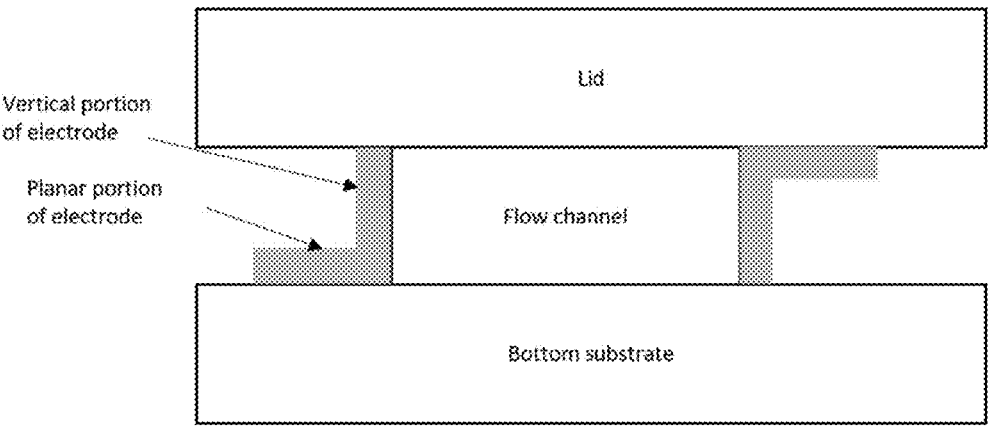
FIG. 14B provides another illustrative diagram for electrode design in the TrACE device.

FIGS. 14A and 14B. Two different drawings of potential electrode designs for the TrACE device. In one example, the planar electrodes can be coupled to the substrate of the device. In another example, the planar electrodes can be coupled to the lid of the device. In another example, planar electrodes can be coupled to both the substrate (bottom) and lid (top) of the device. In another example, the planar electrode can be coupled to the substrate (bottom) on one side of the flow channel and the planar electrode can be coupled to the lid (top) on the other side of the flow channel. Additionally, or alternatively, any of the planar electrode configurations described herein can be used in combination with vertical electrodes. The vertical electrodes can be coupled to the vertical wall of the flow channel. The vertical electrode can be coupled to the wall of the flow channel on one side of the flow channel, or the vertical electrode can be coupled to the wall of the flow channel on both sides of the flow channel.

Figure 15:
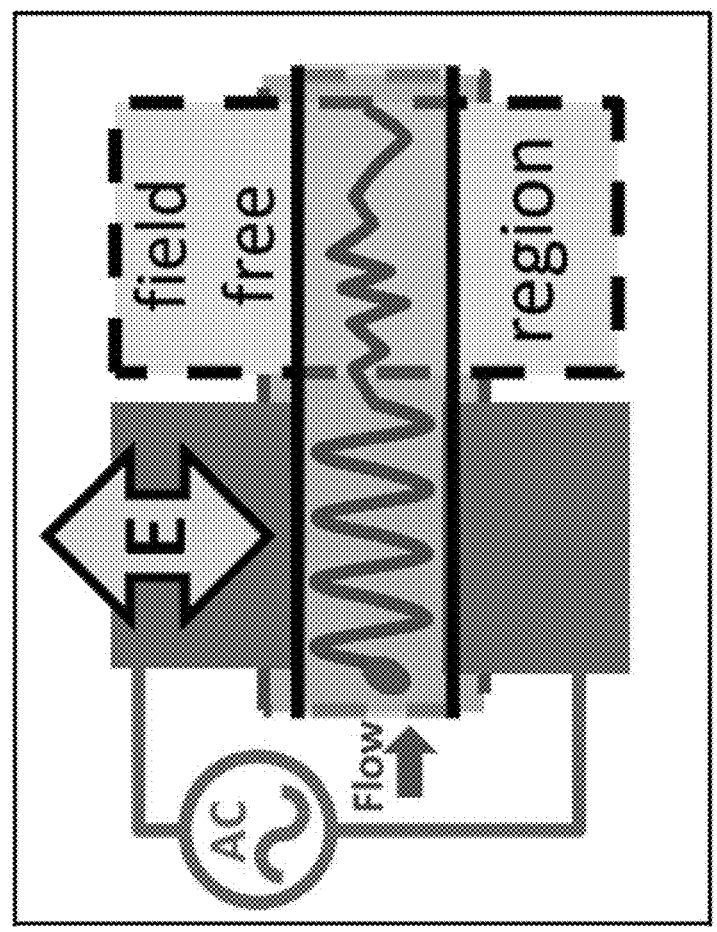
FIG. 15 provides a schematic of an exemplary microchannel TrACE device.

FIG. 15 provides a schematic of an exemplary microchannel TrACE device. A low-frequency sine wave can be applied across the microchannel, inducing oscillation of bacteria. The trajectory of individual bacteria can be captured optically. Flow through the microchannel can be pressure driven. The use of a field free region can be investigated for increasing the precision of the size measurement by Brownian motion. The sine wave scans the magnitude of the electric field and measures the electric field dependence of the electrophoretic mobility.

The exemplary schematic provides a TrACE microfluidic system for multi-parameter analysis of single bacterial cells that can measure the size, charge, shape, and deformability of single bacterial cells, as shown in FIG. 15. TrACE provides advanced physical analysis of individual bacterial cells while being compatible with microfluidic sorting systems that may be known in the art. Thus, the disclosed technology can be used to determine the precision of the size, charge, shape, and deformability measurements and the ability to distinguish bacteria from the human gut microbiome using TrACE.

Figure 16:
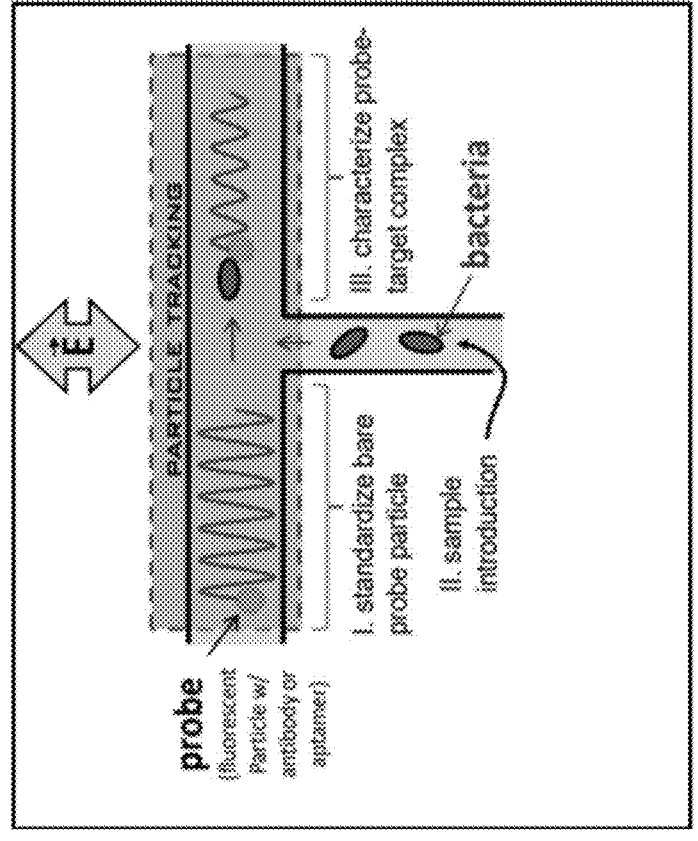
FIG. 16 provides a schematic showing an example scheme for integration of on-line labeling in a TrACE device.

FIG. 16 provides a schematic showing a scheme for integration of on-line labeling in TrACE. In addition to molecular labeling agents used in flow cytometry, a unique single particle labeling scheme can be described. In the scheme, fluorescent beads decorated with a selective recognition element—for example, an antibody—can be characterized immediately before binding with the probe beads. Detection can be achieved by binding the bacteria and the probe, which perturbs oscillation of the probe. For example, the probe can oscillate at a first frequency or a first velocity when not attached to a bacterial cell. The probe and bacterial cell can oscillate at a second frequency or a second velocity when attached. A change from the first frequency to the second frequency, or from the first velocity to the second velocity may indicate the probe is bound to the bacterial cell or other information about the bacterial cell, for example the charge, size, shape, or deformability of the bacterial cell.

The present disclosure provides advantages to the current state of the art. For example, the TrACE system can be used to acquire fecal microbiome signatures comparatively rapidly and inexpensively. The system further provides benefits in: the use of particle tracking in combination with a low-frequency AC electric field; transverse orientation of electrodes, which provides wave-like motion and eliminates axial electroosmotic flow (EOF); short inter-electrode distances provide a high electric field while avoiding water hydrolysis and bubble production; a microchannel with large dimensions is not prone to clogging; and measurement precision is enhanced by ensemble averaging of multiple wave cycles.

Figure 17A:
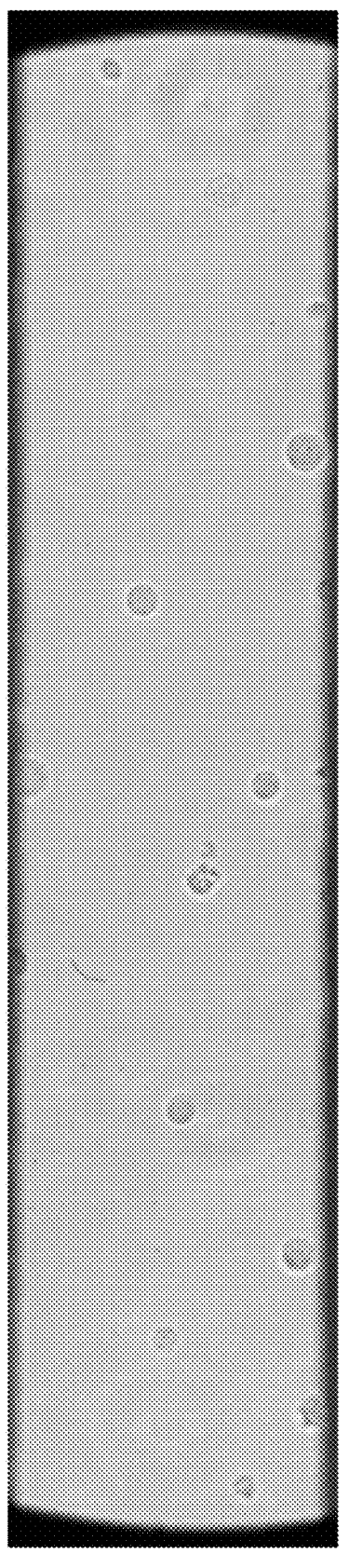
FIGS. 17A and 17B provide examples of a response to an electrical wave in the TrACE system from human B cells.
Figure 17B:
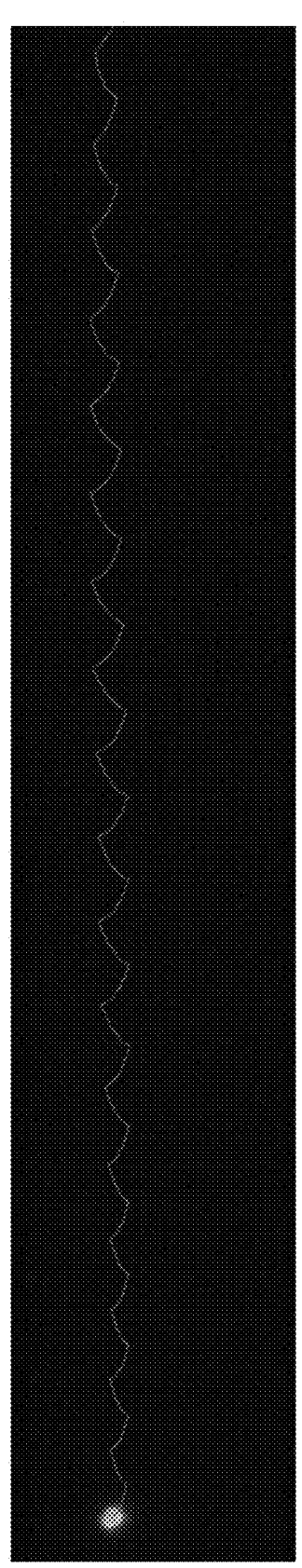

FIGS. 17A and 17B provide examples of a response to an electrical wave in the TrACE system from human B cells. FIG. 17A shows a brightfield image of human B cells in the microchannel of the TrACE system. FIG. 17B shows a human B cell that is fluorescently labeled with Chromeo dye for fluorescence microscopy. A square wave with 1.5 V amplitude at 10 Hz, for example, can be applied to the system and the trajectory of the fluorescently labeled human B cell can be recorded.

Figure 18:
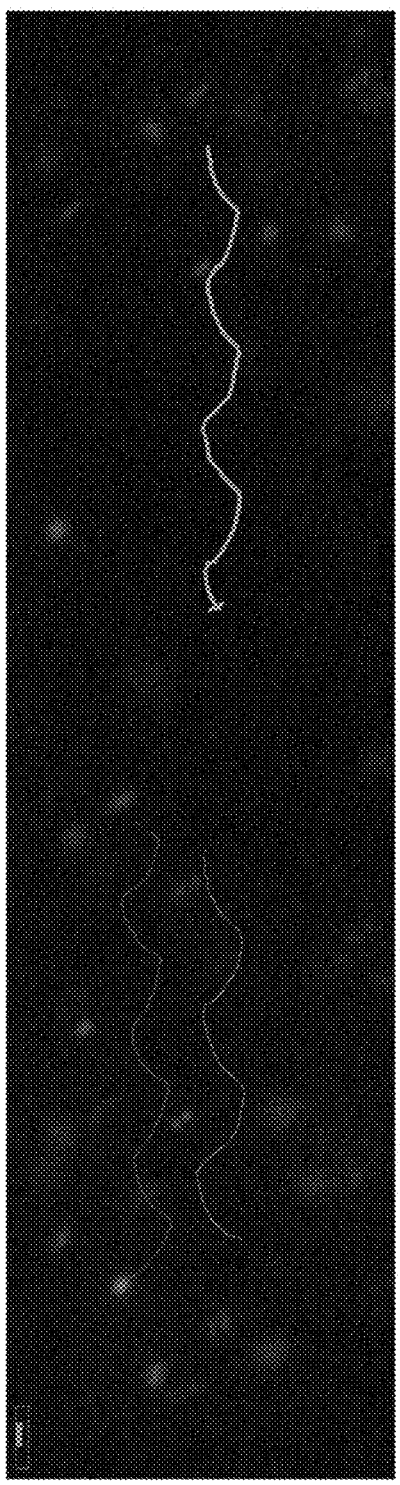
FIG. 18 provides a diagram of *E. coli* response to an electric wave in the TrACE system.

FIG. 18 provides a diagram of *E. coli* response to an electric wave in the TrACE system. *E. coli* are fluorescently labeled with Chromeo dye for fluorescence microscopy. A square wave with 1 V amplitude at 10 Hz, for example, can be applied to the system and the trajectory of the fluorescently labeled *E. coli* cells can be recorded.

Figure 19:
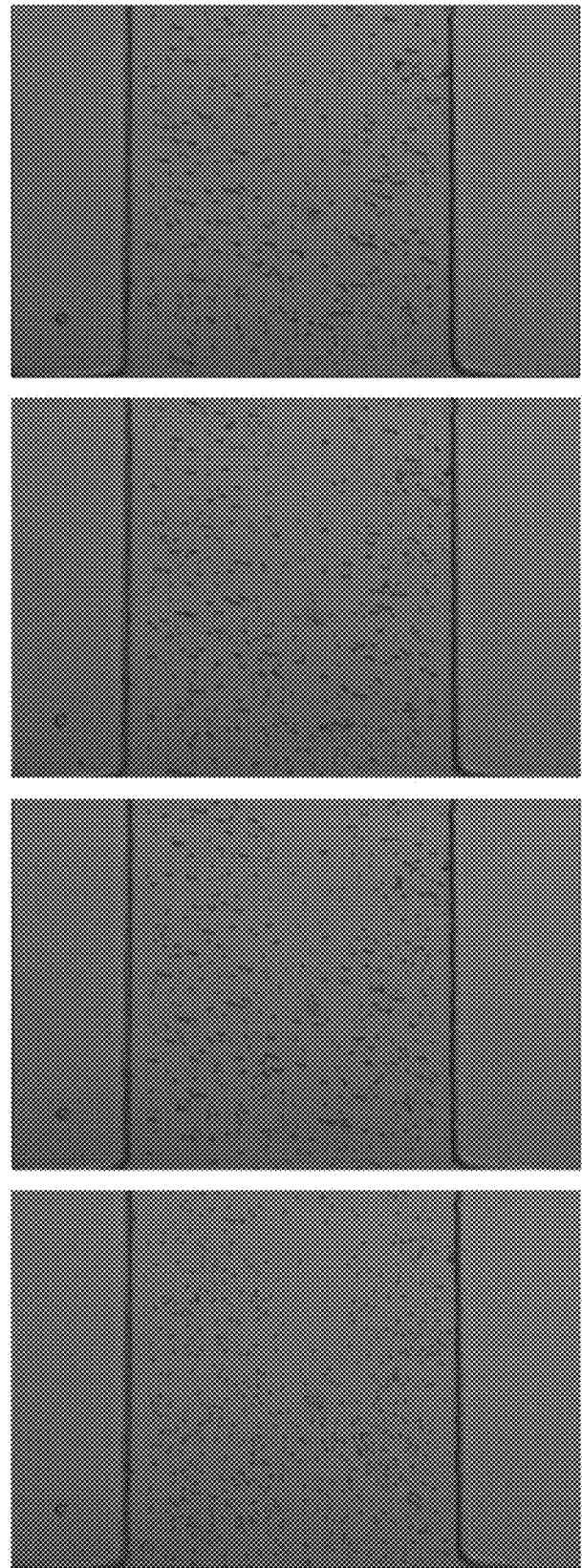
FIG. 19 provides time-ordered diagrams of a response of particles to an introduction of a magnetic field in the TrACE system.

FIG. 19 provides time-ordered diagrams of a response of particles to an introduction of a magnetic field in the TrACE system. For example, 3 μm magnetic particles can be imaged in the TrACE system. An alternating magnetic field can be created across the microchannel width of the TrACE system by applying, for example, a square wave with 10 V amplitude at 1 Hz to coils placed transversely to the length of the microchannel.

Though not shown, a complex may be generated by contacting a probe with a sample, and information about the sample, probe, and complex may be determined based on one or more of behavior of the probe or behavior of the complex in the TrACE system. The probe, the particle, or the complex may move in the TrACE microfluidic channel based on force applied by an electric charge in an electric field or magnetism in a magnetic field. For example, human red blood cells contain sufficient quantities of iron to be affected by magnetic fields. As other cells and bacteria do not respond to magnetic fields, one can utilize the disclosed technology with an electric field to assess binding and other behaviors of such other cells and bacteria.

Figure 20:
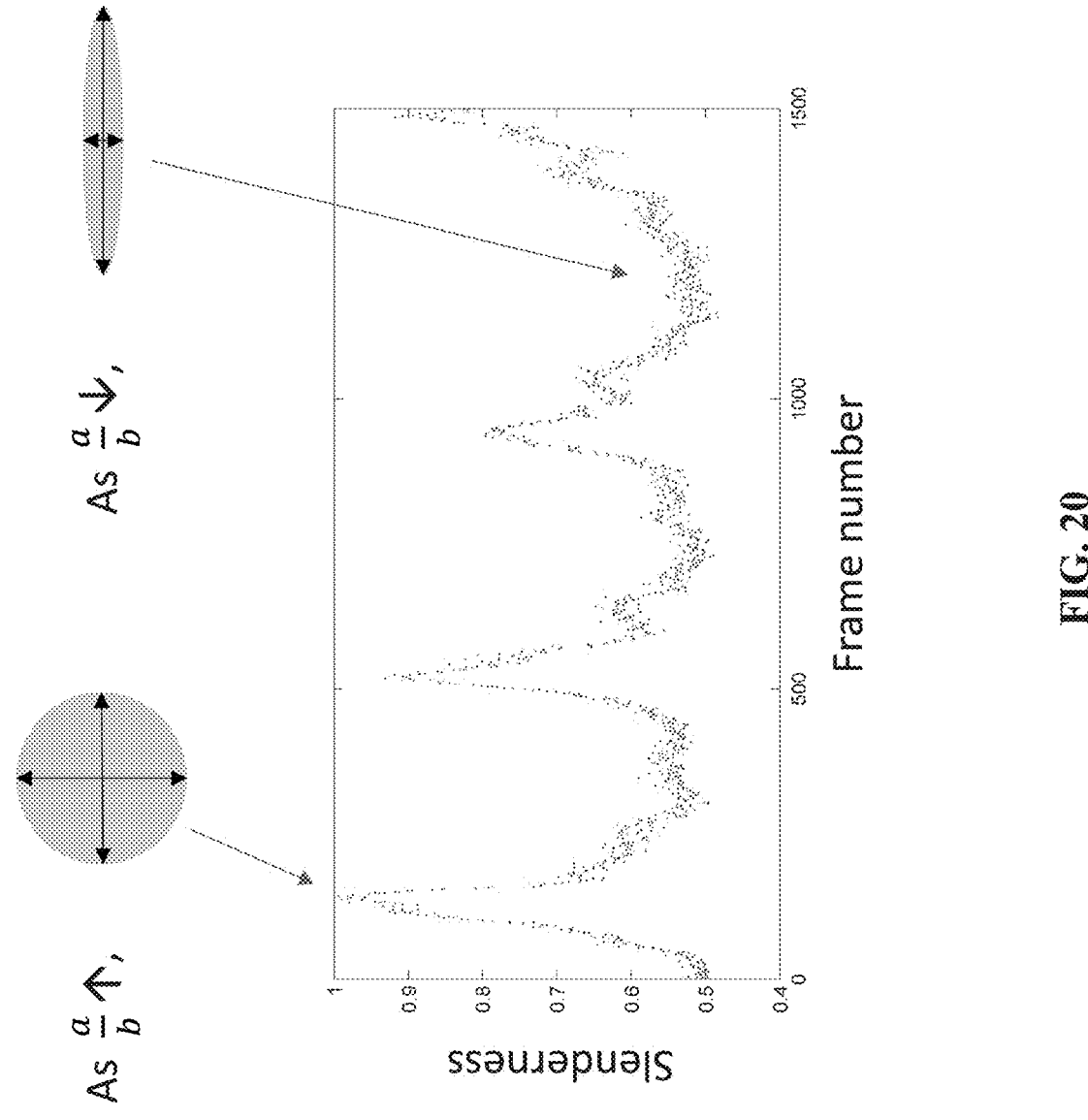
FIG. 20 provides a graph showing a changing slenderness of a particle in the TrACE system as a function of time.

FIG. 20 provides a graph showing a changing slenderness of a particle in the TrACE system as a function of time. As a particle transverses along the microchannel of the TrACE system the particle can rotate. Particles that are not perfectly spherical can change in slenderness as the particle moves transversely along the length of the microchannel. The changing slenderness of the particle can be measured, and the changing slenderness of the particle can indicate a rotation of the particle as the particle moves along the microchannel. The rate of change of the slenderness of the particle can correlate to a rate of rotation of the particle.

Changing slenderness, and rotation, can also indicate particle deformability. As particles with uneven surfaces, e.g., particles that are not perfectly spherical or otherwise symmetrical, are acted upon by the electric or magnetic field in the TrACE system, the particles can align with the electric or magnetic field, and the particles can be stretched by the electric or magnetic field. The particular deformability of particles can be measured by the system.

Figure 21:
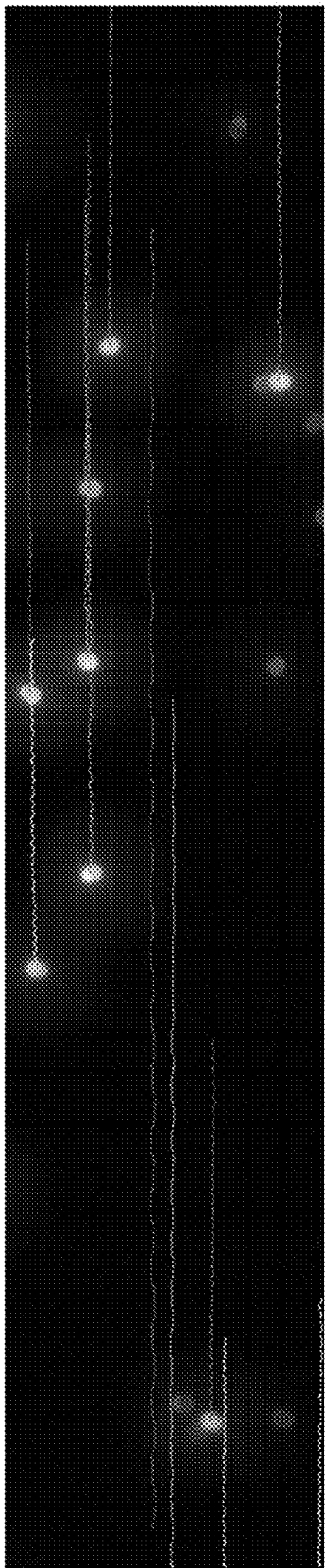
FIG. 21 provides a diagram of a response to an electric wave in the TrACE system by a pear-shaped particle.

FIG. 21 provides a diagram of a response to an electric wave in the TrACE system by a pear-shaped particle. Pear-shaped polystyrene particles can be dyed, for example the polystyrene particles can be dyed using Nile Red for fluorescence microscopy. A wave, for example a square wave with 1.2 V amplitude at 10 Hz can be applied to the TrACE system and the trajectory of the fluorescently dyed polystyrene particles can be recorded.

Figures 22A, 22B:
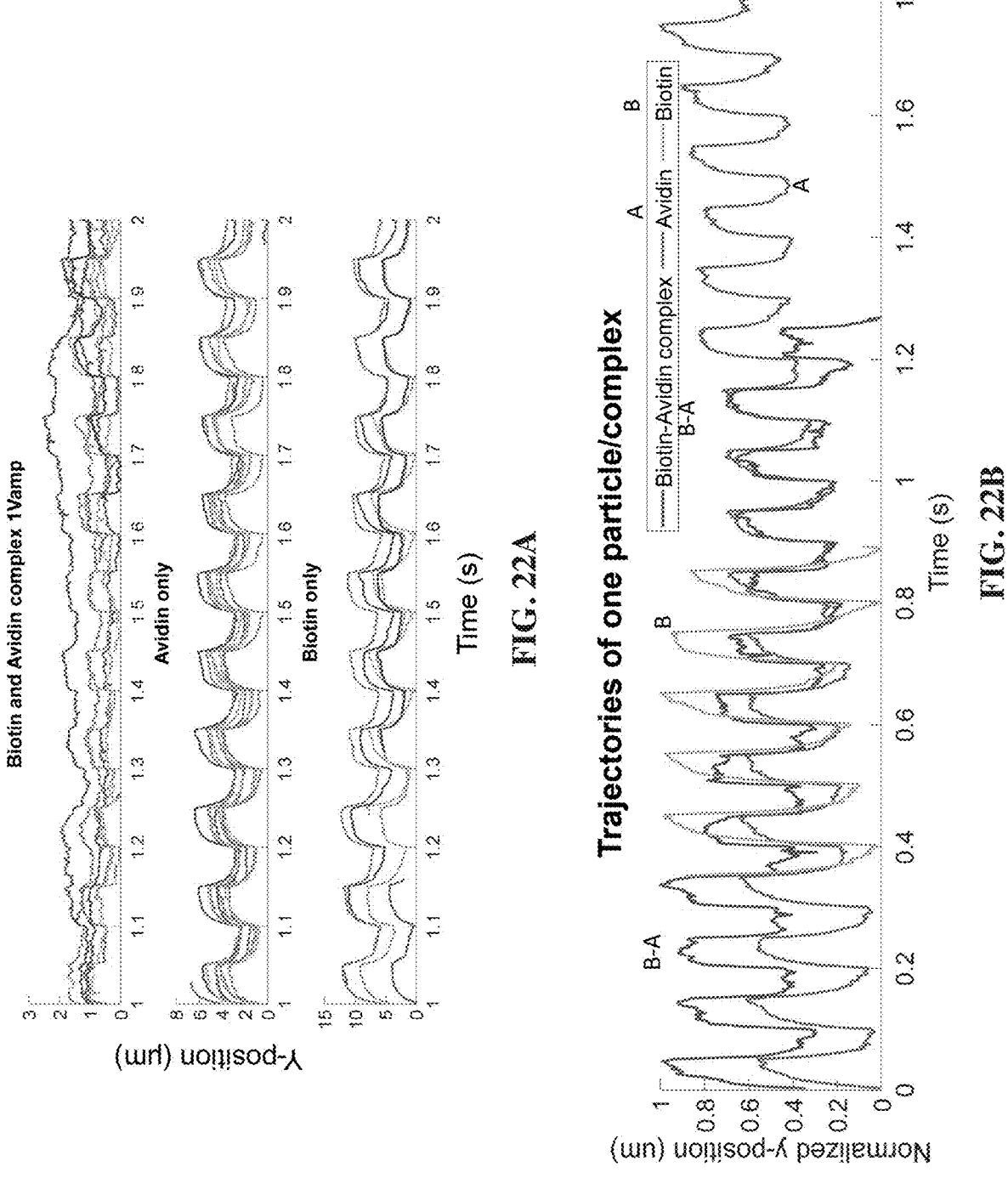
FIGS. 22A-22B provides diagrams of a position of different particles in the TrACE system over time, as the different particles travel along the microchannel of the TrACE system.

FIGS. 22A-22B provide diagrams of a position of different particles in the TrACE system over time, as the different particles travel along the microchannel of the TrACE system. For example, FIGS. 22A-22B show the trajectories of biotin particles alone (22B), avidin particles alone (22A), and biotin and avidin complexes (22B-22A). The biotin and avidin complex can be a molecule of biotin combined with a molecule of avidin to produce the biotin and avidin complex. The biotin and avidin complex can exhibit different properties when exposed to the TrACE system than individual biotin and individual avidin molecules alone.

Figure 23:
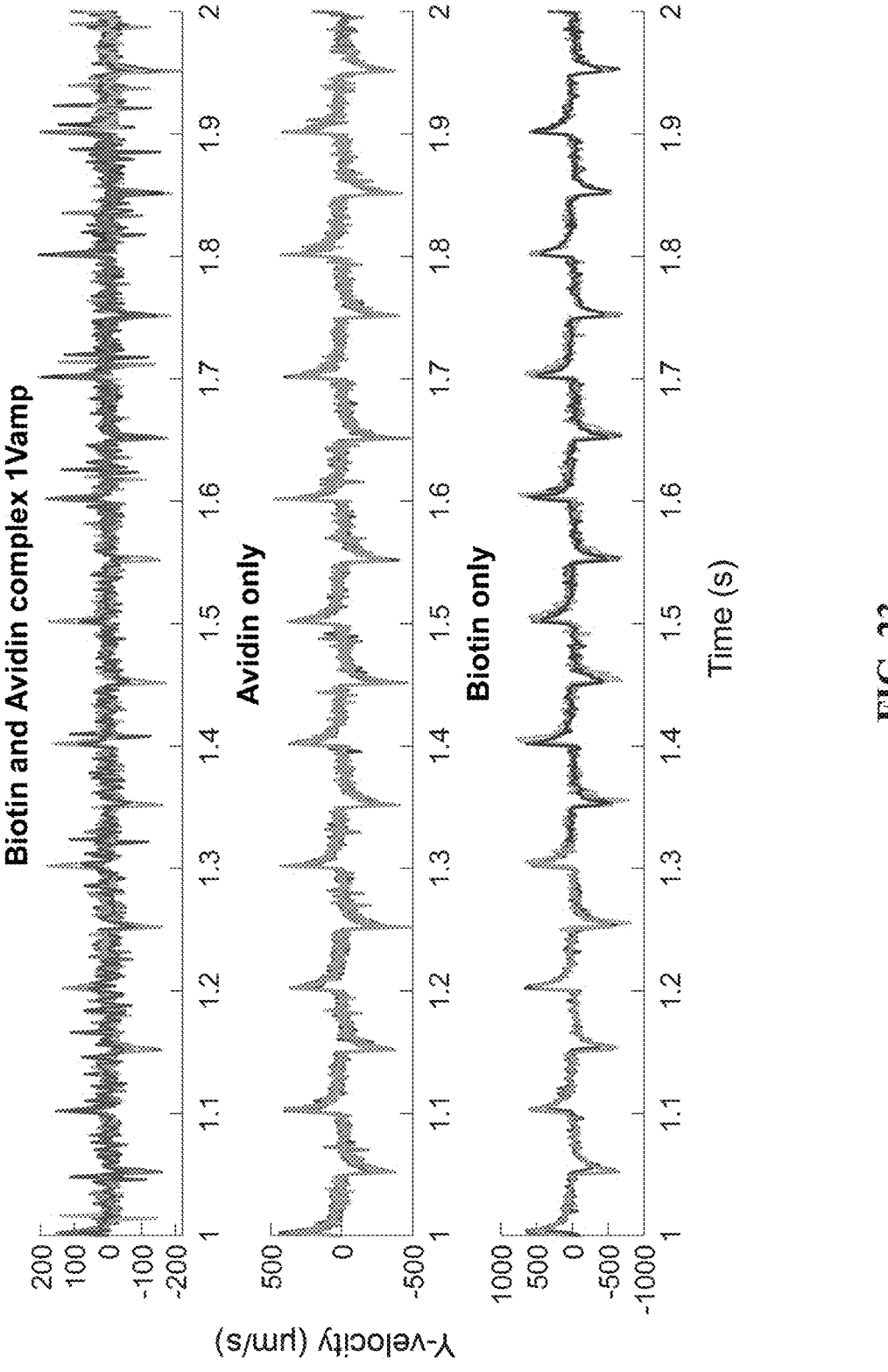
FIG. 23 provides diagrams of velocities of different particles in the TrACE system over time, as the different particles travel along the microchannel of the TrACE system.

FIG. 23 provides diagrams of velocities of different particles in the TrACE system over time, as the different particles travel along the microchannel of the TrACE system. For example, FIG. 23 shows the velocities of biotin molecules along, avidin particles alone, and biotin and avidin complexes. The biotin and avidin complex can be a molecule of biotin combined with a molecule of avidin to produce the biotin and avidin complex. The biotin and avidin complex can exhibit different properties, for example different velocities, when exposed to the TrACE system than individual biotin and individual avidin molecules alone. The width of the peaks of the biotin and avidin complex is smaller when compared to the widths of the peaks of the biotin only and avidin only particles.

The TrACE system can be used to determine numerous characteristics about cells of interest. For example, the TrACE system can determine one or more of the 1) electrophoretic mobility, 2) size, 3) shape, 4) calculation of surface charge or zeta potential, 5) specific features (e.g., ligands, receptors, hydrophobicity, hydrophilicity) of the particle via binding (device with at least 3 channel segments), 6) particle deformability (from stretching particle with non-homogenous surface charge in the electric field), 7) electroporation in the electric field to introduce pores in the particle membrane, and 8) rotation induced by the switching direction of the electric field.

ASPECTS

The following Aspects are illustrative only and do not limit the scope of the present disclosure or the appended claims. Any part or parts of any one or more Aspects can be combined with any part or parts of any one or more other Aspects.

Aspect 1. A method, comprising: determining an electrophoretic mobility associated with a particle, based at least in part on passing the particle through a transverse alternating force microfluidic channel; and optionally determining a size of the particle based at least in part on one of Brownian motion of the particle or one or more images of the particle.

Aspect 2. The method of Aspect 1, further comprising: determining a shape of the particle, based at least in part on the size of the particle and the electrophoretic mobility of the particle.

Aspect 3. The method of any one of Aspects 1-2, further comprising: determining, based on the size of the particle, the electrophoretic mobility associated with the particle, and the shape, a surface charge associated with the particle.

Aspect 4. The method of any one of Aspects 1-3, wherein the alternating force comprises at least one of an alternating current, an alternating electric field, or an alternating magnetic field. One can apply an alternating electric field, which produces an alternating electric current.

Aspect 5. The method of any one of Aspects 1-4, wherein the surface charge is a zeta potential.

Aspect 6. The method of any one of Aspects 1-5, wherein the particle comprises any one or more of a biological cell, a bacterial cell, a viral particle, an organic particle, or an inorganic particle.

Aspect 7. The method of any one of Aspects 1-6, wherein the Brownian motion of the particle is determined, at least in part, on a motion of the particle in a portion of the microfluidic channel devoid of the transverse AC. The Brownian motion, however, does not have to be measured in a field free region. For example, the Brownian motion can be measured in the region comprising the transverse alternating force.

Aspect 8. The method of any one of Aspects 1-7, wherein the electrophoretic mobility comprises a velocity of the particle in response to an application of an electric field.

Aspect 9. The method of any one of Aspects 1-8, wherein the transverse alternating current comprises at least one of a sinusoidal wave, a triangular wave, a complex wave, a square wave, a complex wave with multiple frequencies, or a wave with any particular shape.

Aspect 10. The method of any one of Aspects 1-9, wherein the particle is a first particle, further comprising: determining an electrophoretic mobility associated with a second particle, based at least in part on passing the second particle through the transverse alternating force microfluidic channel; and optionally determining a size of the second particle based at least in part on one of Brownian motion of the second particle or one or more images of the second particle. The first particle and the second particle can be assessed simultaneously, but this is not a requirement, as the first and second particles can be assessed sequentially. The first particle and the second particle can be present in a microchannel system at the same time, but this is not required, as the first particle and the second particle can be present in the system at different times.

Aspect 11. The method of any one of Aspects 1-10, further comprising classifying the particle based on one or more of the particle size, the electrophoretic mobility, the particle shape, or the particle surface charge.

Aspect 12. The method of any one of Aspects 2-11, further comprising classifying the particle based at least on the particle size, the particle shape, and the particle surface charge.

Aspect 13. A system comprising: a microfluidic channel; a plurality of electrodes oriented transverse to the microfluidic channel, the plurality of electrodes comprising an alternating current (AC) electric field; and a classification system configured to: determine an electrophoretic mobility associated with a particle, based at least in part on passing the particle through the transverse AC microfluidic channel; and optionally determine, based at least in part on one of Brownian motion of the particle or one or more images of the particle, a size of the particle.

Aspect 14. The system of Aspect 13, wherein the classification system is configured to: determine, based at least in part on the size of the particle and the electrophoretic mobility of the particle, a shape of the particle.

Aspect 15. The system of Aspect 13-14, wherein the classification system is further configured to: determine, based on the size of the particle, the electrophoretic mobility associated with the particle, and the shape of the particle, a surface charge associated with the particle.

Aspect 16. The system of any one of Aspects 13-15, wherein the surface charge is a zeta potential.

Aspect 17. The system of any one of Aspects 13-16, wherein the particle comprises a biological cell, a bacterial cell, a viral particle, an organic particle, or an inorganic particle.

Aspect 18. The system of any one of Aspects 13-17, wherein the Brownian motion of the particle is determined, at least in part, on a motion of the particle in a portion of the microfluidic channel devoid of the transverse alternating electric field. However, the Brownian motion does not have to be measured in a field free region. For example, the Brownian motion can be measured in the region comprising the transverse alternating force.

Aspect 19. The system of any one of Aspects 13-18, wherein the electrophoretic mobility comprises a velocity of the particle in response to an application of an electric field.

Aspect 20. The system of any one of Aspects 13-19, wherein the transverse alternating electric field comprises at least one of a sinusoidal wave, a triangular wave, a complex wave, a square wave, a complex wave with multiple frequencies, or a wave with any particular shape.

Aspect 21. The system of any one of Aspects 13-20, wherein the particle is a first particle and wherein the classification system is further configured to: determine an electrophoretic mobility associated with a second particle, based at least in part on passing the second particle through the transverse alternating force microfluidic channel; and optionally determine a size of the second particle based at least in part on one of Brownian motion of the second particle or one or more images of the second particle.

Aspect 22. The system of any one of Aspects 13-21, wherein the classification system is further configured to classify the particle based on one or more of the particle size, the electrophoretic mobility, the particle shape, or the particle surface charge.

Aspect 23. The system of any one of Aspects 14-22, wherein the classification system is further configured to classify the particle based at least on the particle size, the particle shape, and the particle surface charge. The classification system can, in some embodiments, also consider measurement and analysis of particle motion.

Aspect 24. A method, comprising: measuring a behavior of a probe subjected to a transverse alternating force in a microfluidic channel at a first point; and measuring, at a second point, a behavior of a complex comprising (i) the probe and (ii) a sample contacted to the probe between the first point and the second point.

Aspect 25. The method of Aspect 24, wherein the behavior is an oscillation.

Aspect 26. The method of any one of Aspects 24-25, wherein a change in behavior of the probe between the first point and the second point is indicative of the probe binding to the sample.

Aspect 27. The method of any one of Aspects 24-26, further comprising: introducing, in a first branch of the microfluid channel, the sample; introducing, in a second branch of the microfluid channel, the probe particle; and imaging, at a portion of the microfluid channel where the sample and the probe particle are contacted, the contacting of the sample and the probe particle. In one aspect, the method comprises measuring the behavior of the complex based on subjecting the complex to the transverse alternating force in the microfluidic channel. In another aspect, the method further comprises intensifying the transverse alternating force to cause the complex to dissociate, and the method can comprise measuring the dissociation of the complex.

What is claimed:

1. A method, comprising:
determining an electrophoretic mobility of a particle passing through a microfluidic channel, based at least in part on subjecting the particle to a transverse alternating force in the microfluidic channel; and
optionally, determining a size of the particle based at least in part on one of Brownian motion of the particle or one or more images of the particle.

2. The method of claim 1, further comprising determining a shape of the particle, based at least in part on the size of the particle and the electrophoretic mobility of the particle.

3. The method of claim 2, further comprising:
determining a surface charge of the particle based at least in part on the size of the particle, the electrophoretic mobility of the particle, and the shape of the particle.

4. The method of claim 3, further comprising classifying the particle based on one or more of the particle size, the electrophoretic mobility of the particle, the particle shape, or the particle surface charge.

5. The method of claim 1, wherein the alternating force comprises at least one of an alternating current, alternating electric field, or an alternating magnetic field.

6. The method of claim 1, wherein the Brownian motion of the particle is determined, at least in part, on a motion of the particle in at least one of a portion of the microfluidic channel devoid of the transverse alternating force or a portion of the microfluidic channel in which the transverse alternating force is present.

7. The method of claim 1, wherein the transverse alternating force comprises at least one of a sinusoidal wave, a triangular wave, a complex wave, a square wave, or a complex wave with multiple frequencies.

8. The method of claim 1, wherein the particle is a first particle, further comprising:
determining an electrophoretic mobility of a second particle passing through the microfluidic channel, based at least in part on subjecting the second particle to the transverse alternating force in the microfluidic channel; and
optionally, determining a size of the second particle based at least in part on one of Brownian motion of the second particle or one or more images of the second particle.

9. A system, comprising:
a microfluidic channel;
a plurality of electrodes oriented transverse to the microfluidic channel, the plurality of electrodes in communication with an alternating electric field source; and
a classification system configured to:
determine an electrophoretic mobility of a particle, based at least in part on passing the particle through the microfluidic channel; and
optionally, determine, based at least in part on one of Brownian motion of the particle or one or more images of the particle, a size of the particle.

10. The system of claim 9, wherein the classification system is further configured to determine, based at least in part on the size of the particle and the electrophoretic mobility of the particle, a shape of the particle.

11. The system of claim 10, wherein the classification system is further configured to:
determine a surface charge of the particle based at least in part on the size of the particle, the electrophoretic mobility of the particle, and the shape of the particle.

12. The system of claim 11, wherein the classification system is further configured to classify the particle based on one or more of the particle size, the electrophoretic mobility, the particle shape, or the particle surface charge.

13. The system of claim 9, wherein the Brownian motion of the particle is determined, at least in part, on a motion of the particle in at least one of a portion of the microfluidic channel devoid of a transverse alternating electric field or a portion of the microfluidic channel in which the transverse alternating electric field is present.

14. The system of claim 9, wherein the electrophoretic mobility is defined, in part, by a velocity of the particle in response to an application of the electric field.

15. The system of claim 9, wherein the transverse alternating electric field comprises at least one of a sinusoidal wave, a triangular wave, a complex wave, a square wave, or a complex wave with multiple frequencies.

16. The system of claim 9, wherein the particle is a first particle and wherein the classification system is further configured to:

determine an electrophoretic mobility of a second particle, based at least in part on passing the second particle through the microfluidic channel; and optionally determine a size of the second particle based at least in part on one of Brownian motion of the second particle or one or more images of the second particle.

17. A method, comprising:

measuring a behavior of a probe subjected to a transverse alternating force in a microfluidic channel at a first point;

measuring, at a second point, a behavior of a complex comprising (i) the probe and (ii) a sample contacted to the probe between the first point and the second point; and comparing the behavior of the probe at the first point and the behavior of the probe at the second point.

18. The method of claim 17, wherein the behavior is an oscillation.

19. The method of claim 17, wherein a change in behavior of the probe between the first point and the second point is indicative of the probe binding to the sample.

20. The method of claim 17, further comprising:

introducing, in a first branch of the microfluidic channel, the sample;

introducing, in a second branch of the microfluidic channel, the probe; and imaging, at a portion of the microfluidic channel where the sample and the probe are contacted, the contacting of the sample and the probe.

\* \* \* \* \*